United States Patent
Xia

(10) Patent No.: US 11,871,280 B2
(45) Date of Patent: Jan. 9, 2024

(54) VNF INSTANTIATION METHOD, NFVO, VIM, VNFM, AND SYSTEM

(71) Applicant: Huawei Technologies Co., Ltd., Shenzhen (CN)

(72) Inventor: Haitao Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/707,210

(22) Filed: Mar. 29, 2022

(65) Prior Publication Data

US 2022/0225170 A1    Jul. 14, 2022

Related U.S. Application Data

(63) Continuation of application No. PCT/CN2020/111906, filed on Aug. 27, 2020.

(30) Foreign Application Priority Data

Sep. 29, 2019   (CN) .......................... 201910937136.8

(51) Int. Cl.
*H04W 28/16* (2009.01)
*H04L 41/0806* (2022.01)

(52) U.S. Cl.
CPC ......... *H04W 28/16* (2013.01); *H04L 41/0806* (2013.01)

(58) Field of Classification Search
CPC .... H04W 28/16; G06F 9/5027; G06F 9/5077; G06F 2009/4557; H04L 41/0893;
(Continued)

(56) References Cited

U.S. PATENT DOCUMENTS 10,496,441 B2 * 12/2019 Ji .......................... G06F 9/45558
2017/0086049 A1   3/2017 Vrzic
(Continued)

FOREIGN PATENT DOCUMENTS

CN    104050045 A    9/2014
CN    106921977 A    7/2017
(Continued)

OTHER PUBLICATIONS

Zhong, Xuxia, Ying Wang, and Xuesong Qiu. "Cost-aware service function chaining with reliability guarantees in NFV-enabled Inter-DC network." 2019 IFIP/IEEE Symposium on Integrated Network and Service Management (IM). IEEE. Apr. 2019.*
(Continued)

*Primary Examiner* — John M MacIlwinen
(74) *Attorney, Agent, or Firm* — Conley Rose, P.C.

(57) ABSTRACT

A system comprises a virtualized network function (VNF) instantiation method, a network function virtualization (NFV) orchestrator (NFVO), a virtualized infrastructure manager (VIM), a VNF manager (VNFM), and a system where when a VNF instance for implementing a function of a multi-access edge application is deployed on an edge cloud using an NFV management and orchestration (NFV-MANO) system structure framework, a location of the VNF instance for implementing the application is no longer determined according to an affinity/anti-affinity rule. Instead, a mapping relationship between a different virtual resource location area on the edge cloud and a quality of service (QoS) attribute is established, so that a virtual resource location area that meets a QoS attribute of a VNF can be dynamically matched for the VNF based on the QoS attribute of the VNF.

20 Claims, 9 Drawing Sheets

(58) Field of Classification Search
CPC ............. H04L 41/0806; H04L 41/0895; H04L 41/0896; H04L 41/12; H04L 41/5045; H04L 41/5048
See application file for complete search history.

(56) References Cited

U.S. PATENT DOCUMENTS

| | | | |
|---|---|---|---|
| 2019/0089588 A1* | 3/2019 | Xu | H04L 49/253 |
| 2019/0109897 A1 | 4/2019 | Cropper et al. | |
| 2019/0173802 A1 | 6/2019 | Xia et al. | |
| 2020/0178198 A1* | 6/2020 | Ding | H04W 60/04 |

FOREIGN PATENT DOCUMENTS

| | | |
|---|---|---|
| CN | 107306201 A | 10/2017 |
| CN | 108353247 A | 7/2018 |
| CN | 108462592 A | 8/2018 |
| CN | 108632055 A | 10/2018 |
| CN | 109347739 A | 2/2019 |
| WO | 2018000240 A1 | 1/2018 |

OTHER PUBLICATIONS

English translation of CN108632055B. (Year: 2017).*
Xu, R. and Zhang, K. English translation of CN109560955A. (Year: 2019).*
Xia, H. English translation of WO2017070A1. (Year: 2017).*
ETSI GS NFV-IFA 009 V1.1.1, Jul. 2016, "Network Functions Virtualisation (NFV); Management and Orchestration; Report on Architectural Options," 31 pages.
Intel, "pCR 28.803 solution for edge computing deployment," 3GPP TSG SA WG5 (Telecom Management) Meeting #124, S5-192404, Feb. 25-Mar. 1, 2019, Taipei, Taiwan, 4 pages.
ETSI GR NFV-IFA 022 V3.1.1, Apr. 2018, "Network Functions Virtualisation (NFV) Release 3; Management and Orchestration; Report on Management and Connectivity for Multi-Site Services," 128 pages.
Fatma Ben Jemaa, et al., "QoS-aware VNF Placement Optimization in Edge-Central Carrier Cloud Architecture," 2016 EEE, 7 pages.
3GPP TR 28.803 V16.0.1, Sep. 2019, "3rd Generation Partnership Project; Technical Specification Group Services and System Aspects; Telecommunication management; Study on management aspects of edge computing (Release 16)," 20 pages.

* cited by examiner

VNF INSTANTIATION METHOD, NFVO, VIM, VNFM, AND SYSTEM

CROSS-REFERENCE TO RELATED APPLICATIONS

This is a continuation of International Patent Application No. PCT/CN2020/111906 filed on Aug. 27, 2020, which claims priority to Chinese Patent Application No. 201910937136.8 filed on Sep. 29, 2019. The disclosures of the aforementioned applications are hereby incorporated by reference in their entireties.

TECHNICAL FIELD

Embodiments of this disclosure relate to communications technologies, and in particular, to a virtualized network function (VNF) instantiation method, a network function virtualization (NFV) orchestrator (NFVO), a virtualized infrastructure manager (VIM), a VNF manager (VNFM), and a system.

BACKGROUND

NFV refers to implementing some network functions (for example, a core network function) through software on information technology (IT) devices, such as a general server unit, a switch, and a memory, by using a virtualization technology in the IT field. In an NFV technology, software and hardware may be decoupled for a network function, so that the network function can be implemented through software and run on a general-purpose IT device. In this way, a user may deploy, instantiate, and migrate a network function to different physical locations of a network according to a requirement, without installing a new device, thereby improving deployment and operating efficiency of a network service (NS), and reducing capital expenditures (CAPEX) and operational expenses (OPEX) of the network. The NS may be a service provided by a plurality of network functions cooperating with each other. For example, a plurality of core network functions may cooperate with each other to provide a core network service.

The Interfaces and Architecture (IFA) Working Group of the NFV Industry Standard Group of the European Telecommunications Standards Institute (ETSI) has developed a NFV management and orchestration (NFV-MANO) system structure framework. When a communications operator deploys an NS of a communications network in a cloud data center by using the NFV-MANO system structure framework, in a process in which an NFVO and a VNF manager (VNFM) in the NFV-MANO system structure framework cooperate with each other to implement VNF instantiation, a location of a virtual resource on which a VNF instance is to be deployed may be determined by using an affinity/anti-affinity rule between VNF instances in a network service NS instance and by using a constraint on a geographical location at which the VNF instance is to be deployed.

With the arrival of the fifth generation (5G) and Internet of things (IoT) era and an increasing quantity of cloud computing applications, cloud computing technologies may not meet requirements of "massive connection, low latency, and high bandwidth" on a terminal side. With emergence of an edge computing technology, a concept of an edge cloud emerges, to extend a cloud computing power to an edge side closest to a terminal. A VNF instance may be deployed on an edge cloud, to implement a function of a multi-access edge computing (MEC) application (or edge application) by using a VNF. However, the edge application may not be combined with another edge application to form a network service, and may not be split into functional components or services with a finer granularity either. Therefore, when a management and orchestration capability of NFV is directed from a central cloud to the edge cloud, an existing affinity/anti-affinity rule used for deploying a VNF instance in an NS is not applicable to deploying a VNF instance on the edge cloud. Therefore, how to determine a deployment location of an edge application on an edge cloud is an aspect to be handled.

SUMMARY

Embodiments of this disclosure provide a VNF instantiation method, an NFVO, a VIM, a VNFM, and a system, to handle a technical aspect of how to determine a deployment location of an edge application on an edge cloud.

A first aspect to a third aspect relate to the following. A VNFM dynamically matches, based on a quality of service (QoS) attribute of a VNF, a location area that meets the QoS attribute of the VNF for the VNF, so that a QoS requirement of a VNF instance can be met after the VNF instance is deployed in the virtual resource location area. Details are as follows.

According to the first aspect, an embodiment provides a VNF instantiation method. In the method, a VNFM may determine, based on a QoS attribute of a to-be-instantiated VNF and a preset mapping relationship between a QoS attribute and a virtual resource location area, a target virtual resource location area in which a VNF instance is to be deployed. Then, the VNFM may send a virtual resource allocation request message to a VIM. The virtual resource allocation request message requests to allocate a virtual resource on which the VNF instance is to be deployed. The virtual resource allocation request message carries information about the target virtual resource location area. Correspondingly, the VNFM receives a virtual resource allocation response message from the VIM. The virtual resource allocation response message indicates information about a target virtual resource on which the VNF instance is to be deployed. The target virtual resource is located in the target virtual resource location area. In this way, the VNFM instantiates the VNF on the target virtual resource based on the information about the target virtual resource.

In a possible implementation, the VNFM may further receive a VNF instantiation request message from an NFVO before determining the target virtual resource location area in which the VNF instance is to be deployed. The VNF instantiation request message requests to instantiate the VNF. In this implementation, the VNFM may obtain the QoS attribute of the VNF in the following two manners. In a first manner, the VNF instantiation request message carries the QoS attribute of the VNF, or, the VNF instantiation request message may not carry the QoS attribute of the VNF, and the VNFM obtains the QoS attribute of the VNF from a VNF descriptor (VNFD) file. In this way, the VNFM can obtain the QoS attribute of the VNF in flexible and diverse manners.

According to the second aspect, an embodiment provides a VNF instantiation method. In the method, an NFVO sends a VNF instantiation request message to a VNFM. The VNF instantiation request message requests to instantiate a VNF. In a possible implementation, the VNF instantiation request message may carry a QoS attribute of the VNF.

According to the third aspect, an embodiment provides a VNF instantiation method. In the method, a VIM receives a virtual resource allocation request message from a VNFM. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF. Then, the VIM sends a virtual resource allocation response message to the VNFM. The virtual resource allocation response message indicates information about a target virtual resource. The target virtual resource is located in the target virtual resource location area.

According to the methods provided in the first aspect to the third aspect, a mapping relationship between a different virtual resource location area and a QoS attribute is established, so that the VNFM can dynamically match, based on the QoS attribute of the VNF, a virtual resource location area that meets the QoS attribute of the VNF for the VNF. In this way, after the VNF instance is deployed in the virtual resource location area, a QoS requirement of the VNF instance can be met, to ensure user experience when a user accesses the VNF instance.

A fourth aspect to a sixth aspect relate to the following. An NFVO dynamically matches, based on a QoS attribute of a VNF, a location area that meets the QoS attribute of the VNF for the VNF, so that a QoS requirement of a VNF instance can be met after the VNF instance is deployed in the virtual resource location area. Details are as follows.

According to the fourth aspect, an embodiment provides a VNF instantiation method. In the method, an NFVO determines, based on a QoS attribute of a to-be-instantiated VNF and a preset mapping relationship between a QoS attribute and a virtual resource location area, a target virtual resource location area in which a VNF instance is to be deployed. Then, the NFVO may send a virtual resource allocation request message to a VIM. The virtual resource allocation request message requests to allocate a virtual resource on which the VNF instance is to be deployed. The virtual resource allocation request message carries information about the target virtual resource location area. Correspondingly, the NFVO receives a virtual resource allocation response message from the VIM. The virtual resource allocation response message indicates information about a target virtual resource on which the VNF instance is to be deployed. The target virtual resource is located in the target virtual resource location area. The NFVO sends a VNF instantiation request message to a VNFM. The VNF instantiation request message requests to instantiate the VNF. The VNF instantiation request message carries the information about the target virtual resource.

In a possible implementation, the NFVO obtains the QoS attribute of the VNF from a VNFD before determining the target virtual resource location area in which the VNF instance is to be deployed.

According to the fifth aspect, an embodiment provides a VNF instantiation method. In the method, a VNFM may receive a VNF instantiation request message from an NFVO. The VNF instantiation request message requests to instantiate a VNF. The VNF instantiation request message carries information about a target virtual resource. The target virtual resource is located in a target virtual resource location area. The target virtual resource location area is a virtual resource location area corresponding to a QoS attribute of the VNF. Then, the VNFM may instantiate the VNF on the target virtual resource based on the information about the target virtual resource.

According to the sixth aspect, an embodiment provides a VNF instantiation method. In the method, a VIM receives a virtual resource allocation request message from an NFVO. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF. Then, the VIM may send a virtual resource allocation response message to the NFVO. The virtual resource allocation response message indicates information about a target virtual resource. The target virtual resource is located in the target virtual resource location area.

According to the methods provided in the fourth aspect to the sixth aspect, a mapping relationship between a different virtual resource location area and the QoS attribute is established, so that the NFVO can dynamically match, based on the QoS attribute of the VNF, a virtual resource location area that meets the QoS attribute of the VNF for the VNF. In this way, after the VNF instance is deployed in the virtual resource location area, a QoS requirement of the VNF instance can be met, to ensure user experience when a user accesses the VNF instance.

A seventh aspect to a ninth aspect relate to the following. A VIM dynamically matches, based on a QoS attribute of a VNF, a location area that meets the QoS attribute of the VNF for the VNF, so that a QoS requirement of a VNF instance can be met after the VNF instance is deployed in the virtual resource location area. Details are as follows.

According to the seventh aspect, an embodiment provides a VNF instantiation method. In the method, a VIM receives a virtual resource allocation request message from a VNFM. The virtual resource allocation request message requests to allocate a virtual resource on which a VNF instance is to be deployed. The virtual resource allocation request message carries a QoS attribute of a VNF. The VIM determines, based on the QoS attribute of the VNF and a preset mapping relationship between a QoS attribute and a virtual resource location area, a target virtual resource location area in which the VNF instance is to be deployed. The VIM may send a virtual resource allocation response message to the VNFM. The virtual resource allocation response message indicates information about a target virtual resource on which the VNF instance is to be deployed. The target virtual resource is located in the target virtual resource location area.

According to the eighth aspect, an embodiment provides a VNF instantiation method. In the method, a VNFM may send a virtual resource allocation request message to a VIM. The virtual resource allocation request message requests to allocate a virtual resource on which a VNF instance is to be deployed. The virtual resource allocation request message carries a QoS attribute of a VNF. The VNFM receives a virtual resource allocation response message from the VIM. The virtual resource allocation response message indicates information about a target virtual resource on which the VNF instance is to be deployed. The target virtual resource is located in a target virtual resource location area. The target virtual resource location area is a virtual resource location area corresponding to the QoS attribute of the VNF. In this way, the VNFM instantiates the VNF on the target virtual resource based on the information about the target virtual resource.

In a possible implementation, the VNFM may receive a VNF instantiation request message from a NFVO before sending the virtual resource allocation request message to the VIM. The VNF instantiation request message requests to instantiate the VNF. In this implementation, the VNFM may obtain the QoS attribute of the VNF in the following two manners. In a first manner, the VNF instantiation request message carries the QoS attribute of the VNF, or, the VNF instantiation request message may not carry the QoS attribute of the VNF, and the VNFM obtains the QoS attribute of the VNF from a VNFD before sending the virtual resource allocation request message to the VIM. In this way, the VNFM can obtain the QoS attribute of the VNF in flexible and diverse manners.

According to the ninth aspect, an embodiment provides a VNF instantiation method. In the method, an NFVO sends a VNF instantiation request message to a VNFM. The VNF instantiation request message requests to instantiate a VNF. In a possible implementation, the VNF instantiation request message may carry a QoS attribute of the VNF.

According to the methods provided in the seventh aspect to the ninth aspect, a mapping relationship between a different virtual resource location area and the QoS attribute is established, so that the VIM can dynamically match, based on the QoS attribute of the VNF, a virtual resource location area that meets the QoS attribute of the VNF for the VNF. In this way, after the VNF instance is deployed in the virtual resource location area, a QoS requirement of the VNF instance can be met, to ensure user experience when a user accesses the VNF instance.

According to a tenth aspect, an embodiment provides a VNF instantiation method. The method includes an NFVO sends a VNF instantiation request message to a VNFM. The VNF instantiation request message requests to instantiate a VNF. The VNFM determines, based on a QoS attribute of the VNF and a preset mapping relationship between a QoS attribute and a virtual resource location area, a target virtual resource location area in which a VNF instance is to be deployed. The VNFM sends a virtual resource allocation request message to a VIM. The virtual resource allocation request message requests to allocate a virtual resource on which the VNF instance is to be deployed. The virtual resource allocation request message carries information about the target virtual resource location area. The VIM sends a virtual resource allocation response message to the VNFM. The virtual resource allocation response message indicates information about a target virtual resource on which the VNF instance is to be deployed. The target virtual resource is located in the target virtual resource location area. The VNFM instantiates the VNF on the target virtual resource based on the information about the target virtual resource.

In a possible implementation, the VNFM may obtain the QoS attribute of the VNF in the following two manners. In a first manner, the VNF instantiation request message carries the QoS attribute of the VNF. Alternatively, the VNF instantiation request message may not carry the QoS attribute of the VNF, and the VNFM obtains the QoS attribute of the VNF from a VNFD. In this way, the VNFM can obtain the QoS attribute of the VNF in flexible and diverse manners.

According to the method provided in the tenth aspect, a mapping relationship between a different virtual resource location area and the QoS attribute is established, so that the VNFM can dynamically match, based on the QoS attribute of the VNF, a virtual resource location area that meets the QoS attribute of the VNF for the VNF. In this way, after the VNF instance is deployed in the virtual resource location area, a QoS requirement of the VNF instance can be met, to ensure user experience when a user accesses the VNF instance.

According to an eleventh aspect, an embodiment provides a VNFM. The VNFM includes a processing unit, a sending unit, and a receiving unit. The processing unit is configured to determine, based on a QoS attribute of a to-be-instantiated VNF and a preset mapping relationship between a QoS attribute and a virtual resource location area, a target virtual resource location area in which a VNF instance is to be deployed. The sending unit is configured to send a virtual resource allocation request message to a VIM. The virtual resource allocation request message requests to allocate a virtual resource on which the VNF instance is to be deployed. The virtual resource allocation request message carries information about the target virtual resource location area. The receiving unit is configured to receive a virtual resource allocation response message from the VIM. The virtual resource allocation response message indicates information about a target virtual resource on which the VNF instance is to be deployed. The target virtual resource is located in the target virtual resource location area. The processing unit is further configured to instantiate the VNF on the target virtual resource based on the information about the target virtual resource.

In a possible implementation, the receiving unit is further configured to receive a VNF instantiation request message from an NFVO before the processing unit determines the target virtual resource location area in which the VNF instance is to be deployed. The VNF instantiation request message requests to instantiate the VNF. In this implementation, the QoS attribute of the VNF may be obtained in the following two manners. The VNF instantiation request message carries the QoS attribute of the VNF. Alternatively, the processing unit is further configured to obtain the QoS attribute of the VNF from a VNFD before determining the target virtual resource location area in which the VNF instance is to be deployed.

According to a twelfth aspect, an embodiment provides an NFVO. The NFVO includes a sending unit. The sending unit is configured to send a VNF instantiation request message to a VNFM. The VNF instantiation request message requests to instantiate a VNF. In a possible implementation, the VNF instantiation request message may carry a QoS attribute of the VNF.

According to a thirteenth aspect, an embodiment provides a VIM. The VIM includes a receiving unit and a sending unit. The receiving unit is configured to receive a virtual resource allocation request message from a VNFM. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF. The sending unit is configured to send a virtual resource allocation response message to the VNFM. The virtual resource allocation response message indicates information about a target virtual resource. The target virtual resource is located in the target virtual resource location area.

For beneficial effects of the VNFM, the NFVO, and the VIM provided in the eleventh aspect to the thirteenth aspect, refer to the beneficial effects of the first aspect to the third aspect, and the tenth aspect. Details are not described herein again.

According to a fourteenth aspect, an embodiment provides an NFVO. The NFVO includes a processing unit, a sending unit, and a receiving unit. The processing unit is configured to determine, based on a QoS attribute of a to-be-instantiated VNF and a preset mapping relationship between a QoS attribute and a virtual resource location area, a target virtual resource location area in which a VNF instance is to be deployed. The sending unit is configured to send a virtual resource allocation request message to a VIM. The virtual resource allocation request message requests to allocate a virtual resource on which the VNF instance is to be deployed. The virtual resource allocation request message carries information about the target virtual resource location area. The receiving unit is configured to receive a virtual resource allocation response message from the VIM. The virtual resource allocation response message indicates information about a target virtual resource on which the VNF instance is to be deployed. The target virtual resource is located in the target virtual resource location area. The sending unit is further configured to send a VNF instantiation request message to a VNFM. The VNF instantiation request message requests to instantiate the VNF. The VNF instantiation request message carries the information about the target virtual resource.

In a possible implementation, the processing unit is further configured to obtain the QoS attribute of the VNF from a VNFD before determining the target virtual resource location area in which the VNF instance is to be deployed.

According to a fifteenth aspect, an embodiment provides a VNFM. The VNFM includes a receiving unit and a processing unit. The receiving unit is configured to receive a VNF instantiation request message from an NFVO. The VNF instantiation request message requests to instantiate a VNF. The VNF instantiation request message carries information about a target virtual resource. The target virtual resource is located in a target virtual resource location area. The target virtual resource location area is a virtual resource location area corresponding to a QoS attribute of the VNF. The processing unit is configured to instantiate the VNF on the target virtual resource based on the information about the target virtual resource.

According to a sixteenth aspect, an embodiment provides a VIM. The VIM includes a sending unit and a receiving unit. The receiving unit is configured to receive a virtual resource allocation request message from an NFVO. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF. The sending unit is configured to send a virtual resource allocation response message to the NFVO. The virtual resource allocation response message indicates information about a target virtual resource. The target virtual resource is located in the target virtual resource location area.

For beneficial effects of the VNFM, the NFVO, and the VIM provided in the fourteenth aspect to the sixteenth aspect, refer to the beneficial effects of the fourth aspect to the sixth aspect. Details are not described herein again.

According to a seventeenth aspect, an embodiment provides a VIM. The VIM includes a processing unit, a sending unit, and a receiving unit. The receiving unit is configured to receive a virtual resource allocation request message sent by a VNFM. The virtual resource allocation request message requests to allocate a virtual resource on which a VNF instance is to be deployed. The virtual resource allocation request message carries a QoS attribute of a VNF. The processing unit is configured to determine, based on the QoS attribute of the VNF and a preset mapping relationship between a QoS attribute and a virtual resource location area, a target virtual resource location area in which the VNF instance is to be deployed. The sending unit is configured to send a virtual resource allocation response message to the VNFM. The virtual resource allocation response message indicates information about a target virtual resource on which the VNF instance is to be deployed. The target virtual resource is located in the target virtual resource location area.

According to an eighteenth aspect, an embodiment provides a VNFM. The VNFM includes a processing unit, a sending unit, and a receiving unit. The sending unit is configured to send a virtual resource allocation request message to a VIM. The virtual resource allocation request message requests to allocate a virtual resource on which a VNF instance is to be deployed. The virtual resource allocation request message carries a QoS attribute of a VNF. The receiving unit is configured to receive a virtual resource allocation response message from the VIM. The virtual resource allocation response message indicates information about a target virtual resource on which the VNF instance is to be deployed. The target virtual resource is located in a target virtual resource location area. The target virtual resource location area is a virtual resource location area corresponding to the QoS attribute of the VNF. The processing unit is configured to instantiate the VNF on the target virtual resource based on the information about the target virtual resource.

In a possible implementation, the receiving unit is further configured to receive a VNF instantiation request message from an NFVO before the sending unit sends the virtual resource allocation request message to the VIM. The VNF instantiation request message requests to instantiate the VNF. In this implementation, the QoS attribute of the VNF may be obtained in the following two manners. The VNF instantiation request message carries the QoS attribute of the VNF. Alternatively, the processing unit is further configured to obtain the QoS attribute of the VNF from a VNFD before the sending unit sends the virtual resource allocation request message to the VIM.

According to a nineteenth aspect, an embodiment provides an NFVO. The NFVO includes a sending unit. The sending unit is configured to send a VNF instantiation request message to a VNFM. The VNF instantiation request message requests to instantiate a VNF. In a possible implementation, the VNF instantiation request message may carry a QoS attribute of the VNF.

For beneficial effects of the VNFM, the NFVO, and the VIM provided in the seventeenth aspect to the nineteenth aspect, refer to the beneficial effects of the seventh aspect to the ninth aspect. Details are not described herein again.

In the first aspect to the nineteenth aspect, the VNF instantiation request message does not carry an affinity rule and/or an anti-affinity rule for deploying the VNF. In other words, the VNF instantiation request message does not trigger a VNF lifecycle management granting request message. In the foregoing manner, a process of instantiating the VNF can be simplified.

In the first aspect to the nineteenth aspect, in a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate. According to the methods provided in the embodiments, a virtual resource location area that meets a QoS attribute of a virtualized multi-access edge application can be dynamically matched for the virtualized multi-access edge application based on the QoS attribute of the virtualized multi-access edge application. In this way, after the virtualized multi-access edge application instance is deployed in the virtual resource location area, a QoS requirement of the virtualized multi-access edge application instance can be met, to ensure user experience when a user accesses the virtualized multi-access edge application.

According to a twentieth aspect, an embodiment provides a VNFM. The VNFM includes a processor and a memory.

The memory is configured to store computer-executable program code. The program code includes instructions. When the processor executes the instructions, the instructions enable the VNFM to perform the actions of the VNFM in any one of the possible implementations of the first aspect to the tenth aspect.

According to a twenty-first aspect, an embodiment provides an NFVO. The NFVO includes a processor and a memory.

The memory is configured to store computer-executable program code. The program code includes instructions. When the processor executes the instructions, the instructions enable the NFVO to perform the actions of the NFVO in any one of the possible implementations of the first aspect to the tenth aspect.

According to a twenty-second aspect, an embodiment provides a VIM. The VIM includes a processor and a memory.

The memory is configured to store computer-executable program code. The program code includes instructions. When the processor executes the instructions, the instructions enable the VIM to perform the actions of the VIM in any one of the possible implementations of the first aspect to the tenth aspect.

According to a twenty-third aspect, an embodiment provides a communications apparatus, including a unit, a module, or a circuit configured to perform the actions of the VNFM that are provided in any one of the possible implementations of the first aspect to the tenth aspect. The communications apparatus may be a VNFM, or may be a module applied to a VNFM, for example, a chip applied to a VNFM.

According to a twenty-fourth aspect, an embodiment provides a communications apparatus, including a unit, a module, or a circuit configured to perform the actions of the NFVO that are provided in any one of the possible implementations of the first aspect to the tenth aspect. The communications apparatus may be an NFVO, or may be a module applied to an NFVO, for example, a chip applied to an NFVO.

According to a twenty-fifth aspect, an embodiment provides a communications apparatus, including a unit, a module, or a circuit configured to perform the actions of the VIM that are provided in any one of the possible implementations of the first aspect to the tenth aspect. The communications apparatus may be a VIM, or may be a module applied to a VIM, for example, a chip applied to a VIM.

According to a twenty-sixth aspect, an embodiment provides a computer program product including instructions. When the computer program product is run on a computer, the computer is enabled to perform the method in any one of the possible implementations of the first aspect to the ninth aspect.

According to a twenty-seventh aspect, an embodiment provides a computer-readable storage medium. The computer-readable storage medium stores instructions. When the instructions are run on a computer, the computer is enabled to perform the method in any one of the possible implementations of the first aspect to the ninth aspect.

According to a twenty-eighth aspect, an embodiment provides a communications apparatus. The communications apparatus stores a computer program. When the computer program is executed by the communications apparatus, the method in any one of the possible implementations of the first aspect to the ninth aspect is implemented. The communications apparatus herein may be, for example, a chip.

According to a twenty-ninth aspect, an embodiment provides a communications system, including an NFVO, a VNFM, and a VIM. The NFVO is configured to perform the method for the NFVO in any one of the possible implementations of the first aspect to the tenth aspect. The VNFM is configured to perform the method for the VNFM in the any one of possible implementations of the first aspect to the tenth aspect. The VIM is configured to perform the method for the VIM in any one of the possible implementations of the first aspect to the tenth aspect. Details are not described herein again.

According to a thirtieth aspect, an embodiment provides a chip. The chip is connected to a memory, and is configured to read and execute a software program stored in the memory, to implement the method provided in any one of the first aspect to the ninth aspect, or any one of the possible implementations of the first aspect to the ninth aspect.

According to a thirty-first aspect, an embodiment provides a chip. The chip includes a processor and a memory. The processor is configured to read a software program stored in the memory, to implement the method provided in any one of the first aspect to the ninth aspect, or any one of the possible implementations of the first aspect to the ninth aspect.

According to the VNF instantiation method, the NFVO, the VIM, the VNFM, and the system provided in the embodiments, a mapping relationship between a different virtual resource location area on an edge cloud and the QoS attribute is established, so that a virtual resource location area that meets a QoS attribute of a VNF can be dynamically matched for the VNF based on the QoS attribute of the VNF. In this way, after a VNF instance is deployed in the virtual resource location area, a QoS requirement of the VNF instance can be met, to ensure user experience when a user accesses the VNF instance.

DESCRIPTION OF EMBODIMENTS

Figure 1:
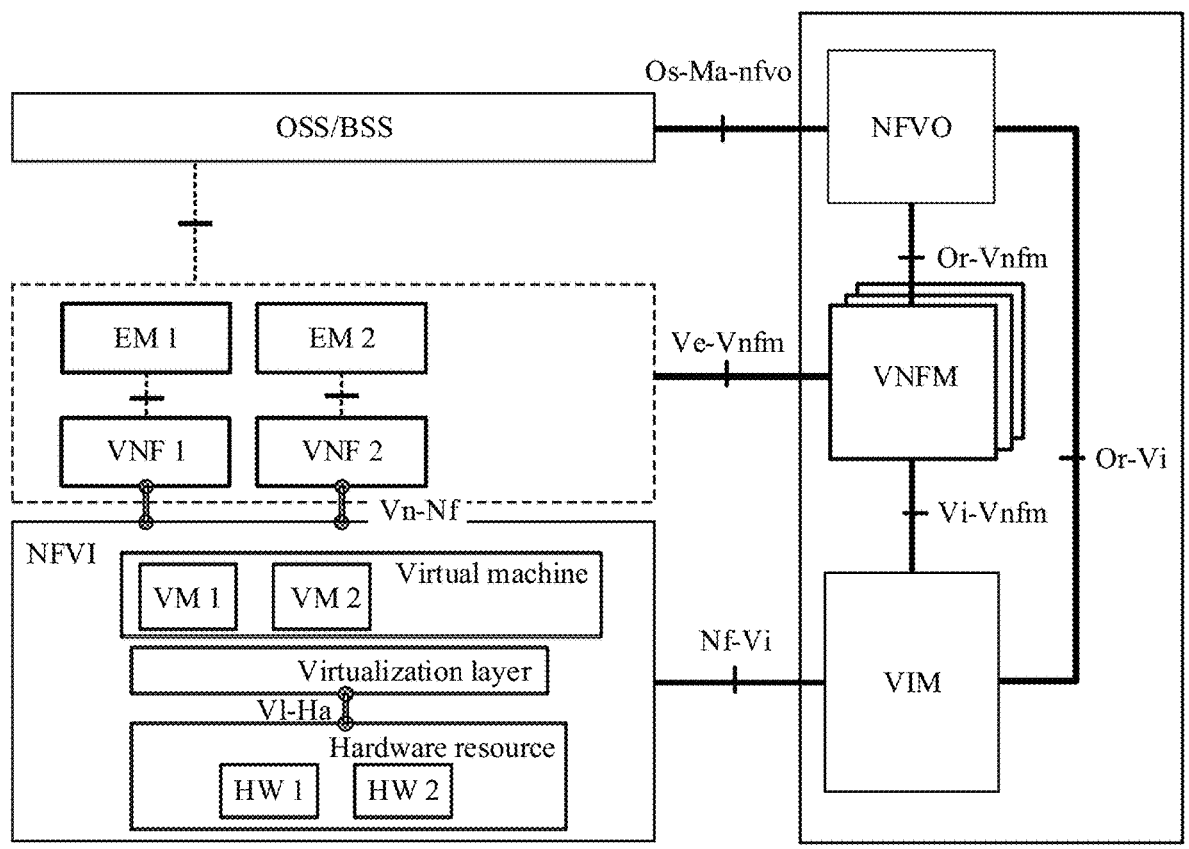
FIG. 1 is a schematic diagram of an ETSI NFV-MANO system structure framework.

FIG. 1 is a schematic diagram of an ETSI NFV-MANO system structure framework. As shown in FIG. 1, the NFV-MANO system structure framework may include an NFVO, a VNFM, a VIM, an NFV infrastructure (NFVI), operations and business support systems (OSS/BSS), and an element manager (EM). A person skilled in the art can understand that the NFV-MANO system structure framework shown in FIG. 1 is not construed as a limitation on the structure framework. During specific implementation, the NFV-MANO system structure framework may include more or fewer functional modules than those shown in the figure, or some functional modules may be combined, or the like.

A VNF corresponds to a physical network function (PNF) in a non-virtualized network, and is configured to implement the physical network function. A functional behavior and a status of a network function may be irrelevant to whether the network function is virtualized, and an NFV technology can enable the VNF and the PNF to have a same functional behavior and a same external interface. Using a fourth generation (4G) core network (Evolved Packet Core (EPC)) as an example, the VNF may be a network element in a virtualized EPC, for example, a virtualized Mobility Management Entity (MME), a virtualized serving gateway (SGW), or a virtualized public data network gateway (PGW).

The NFVI is an infrastructure layer of an NFV function, and includes a hardware (HW) resource, a virtual resource, and a virtualization layer. The hardware resource includes a plurality of pieces of HW. Each HW may be a hardware entity capable of running at least one virtual machine (VM). For example, one piece of HW may be an IT device (for example, a general-purpose server, switch, or memory). The virtualization layer is configured to virtualize the HW to form at least one virtual machine (VM). One VNF instance can be run on each VM. From a perspective of the VNF, the virtualization layer and the hardware resource may be considered as a complete entity capable of providing a virtual resource required by a VNF instance. The VNF instance herein is a result of instantiating the VNF. A quantity of pieces of HW included in the hardware resource and a quantity of VMs that can be run on one piece of HW in FIG. 1 are merely examples. This is not limited in this embodiment.

The NFVO is configured to manage and process a network service descriptor (NSD) and a VNF forwarding graph (VNFFG), manage a lifecycle of an NS, and cooperate with the VNFM to manage a lifecycle of a VNF, and has a global view function for virtual resources, and the like.

The VNFM is configured to manage a lifecycle of a VNF and manage a VNFD. The VNFD describes configuration information of a VNF in a deployment phase and an operating phase. The managing the lifecycle of the VNF herein includes a series of management operations in the entire lifecycle from creation of a VNF instance to termination of the VNF instance, for example, instantiation of the VNF, elastic scaling (for example, scaling out/up or scaling in/down) of the VNF instance, healing of the VNF instance, updating of the VNF instance, and termination of the VNF instance.

The VIM is configured to manage (for example, reserve resources and allocate resources) virtualized resources (for example, virtual computing resources, storage resources, and network resources) at the infrastructure layer, monitor a virtual resource status, report a virtual resource failure, provide a virtualized resource pool for an upper-layer application, and the like.

The OSS/BSS are integrated support systems of a telecommunications operator for sharing information resources, and mainly include the following parts: network management, system management, charging, business, accounting, customer services, and the like. In the architecture shown in FIG. 1, the OSS/BSS is configured to manage a network.

The element manager (EM) is configured to perform fault, configuration, account, performance, and security management (fault management, configuration management, account management, performance management, security management (FCAPS)) and the like for a VNF.

In the NFV-MANO system structure framework shown in FIG. 1, the NFVO, the VNFM, and the VIM may be separately deployed on different hardware entities, or may be deployed on one hardware entity, or some of the NFVO, the VNFM, and the VIM may be deployed on one hardware entity. This may be arranged according to a requirement. This is not limited in this embodiment. In some embodiments, the NFVO, the VNFM, and the VIM may be alternatively referred to as an NFVO entity, a VNFM entity, and a VIM entity. The entity may be a logical entity, a hardware entity, or the like.

Currently, a communications operator may deploy an NS of a communications network in a data center by using the NFV-MANO system structure framework shown in FIG. 1 in the foregoing manner, to improve deployment and operating efficiency of the NS, and reduce a CAPEX and an OPEX of the network. When the NS is deployed in the data center, in a process in which the NFVO and the VNFM cooperate to implement VNF instantiation, a virtual resource location constraint mechanism for deploying a VNF instance mainly includes the following two aspects.

Aspect 1: Affinity/Anti-Affinity Rule:

An affinity/anti-affinity rule between a plurality of VNF instances in an NS instance is defined in an NSD. The rule is used to indicate to deploy newly deployed VNF instances in the NS instance to a same location area or different location areas, and deploy a newly deployed VNF instance to a location area that is the same as or different from that of an already deployed VNF instance in the NS instance (a location area may also be referred to as a virtual resource location area, and this is not distinguished in this embodiment). For example, when two VNF instances meet an affinity rule, the two VNF instances may be deployed in a same location area, or when two VNF instances meet an anti-affinity rule, the two VNF instances are deployed in different location areas. The foregoing location area includes but is not limited to an NFV infrastructure point of presence (NFVI-PoP), an NFV infrastructure zone (NFVI-Zone), an NFVI-Zone group, an NFV infrastructure node (NFVI-node), and the like.

Aspect 2: Geographical Location Constraint (VNF Location Constraint):

A geographical location constraint for deploying a VNF instance is defined in an NS lifecycle management operation. For example, the VNF instance is deployed on a virtual resource of a specified NFVI-PoP.

When a network function of the communications network is implemented by a VNF, because there is an explicit dependency relationship or association relationship between network functions and between components in one network function, with the foregoing location constraint mechanism (the aspect 1 and the aspect 2) for deploying a VNF instance, reliability and robustness of an NS including network functions that serves as an operating entity can be ensured.

Figure 2:
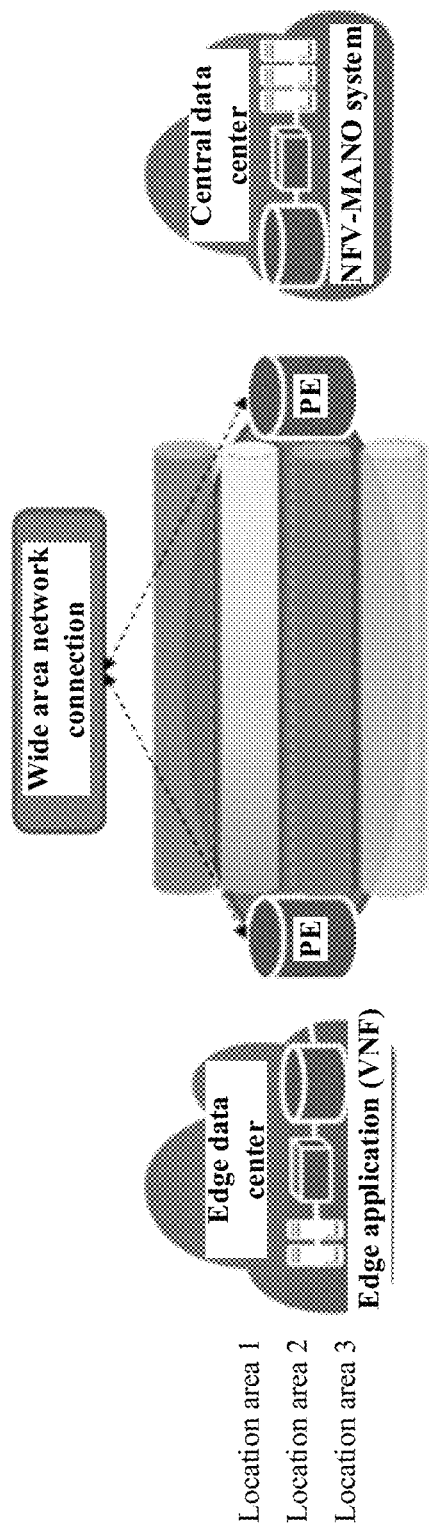
FIG. 2 is a schematic diagram of a cloud platform according to an embodiment.

FIG. 2 is a schematic diagram of a data center according to an embodiment. As shown in FIG. 2, with the arrival of the 5G and internet of things era and an increasing quantity of cloud computing applications, cloud computing technologies may not meet requirements of "massive connection, low latency, and high bandwidth" on a terminal side. With emergence of a multi-access edge computing technology, a concept of an edge data center emerges, to extend a cloud computing power to an edge side closest to a terminal. The edge data center is a concept related to a data center, is a data center built on edge infrastructure based on a core of a cloud computing technology and a capability of multi-access edge computing, and forms an elastic cloud platform of computing, network, storage, security, and other capabilities at an edge location. In this scenario, the data center may be referred to as a central data center or a central cloud, and the edge data center may be referred to as an edge cloud. A central cloud may be connected to a plurality of edge clouds distributed in different locations by using a provider edge (PE) of a wide area network. FIG. 2 is a schematic diagram of an example in which a central cloud is connected to one edge cloud. With network forwarding, storage, computing, and other operations performed on the edge cloud, a response latency, a load on a cloud, and bandwidth costs can be reduced, and cloud services such as network-wide scheduling and computing power distribution can be provided. In this embodiment, the concept of the edge cloud is equivalent to the concept of the edge data center. This is not distinguished in this embodiment.

A VNF instance may be deployed on the edge cloud, to implement a function of an edge application by using a VNF. Then, the edge application is not combined with another edge application into a network service, and is not split into functional components or services with a finer granularity either. Therefore, when a management and orchestration capability of NFV is directed from the central cloud to the edge cloud, the existing affinity/anti-affinity rule in the location constraint mechanism used for deploying a VNF instance in an NS is not applicable to deploying a VNF instance on the edge cloud. For example, the edge application is a high-definition video application. If a location of a "VNF instance for implementing the application" is determined still by using the foregoing affinity/anti-affinity rule, because the rule focuses on a dependency relationship or an association relationship between VNF instances and between components in a VNF instance, but does not focus on characteristics of a VNF instance itself, network characteristics of the determined location at which the VNF instance is to be deployed may not be able to meet QoS attributes of high bandwidth and low latency of the application. In this case, after the VNF instance is deployed at the location, the VNF instance cannot meet network characteristics of high bandwidth and low latency, and consequently, user experience is poor when a user accesses the high-definition video application by using a terminal.

Therefore, how to determine a deployment location of an edge application on an edge cloud is an aspect to be handled.

An edge application can independently provide a service, and different edge applications have different QoS attributes (that is, there are different QoS requirements for an edge network). Therefore, the embodiments provide a VNF instantiation method. When a VNF instance for implementing a function of an edge application is deployed on an edge cloud by using the NFV-MANO system structure framework shown in FIG. 1, a location of the "VNF instance for implementing the application" is no longer determined according to the foregoing affinity/anti-affinity rule. Instead, a mapping relationship between a different virtual resource location area on the edge cloud and a QoS attribute is established, so that a virtual resource location area that meets a QoS attribute of a VNF can be dynamically matched for the VNF based on the QoS attribute of the VNF. In this way, after a VNF instance is deployed at a target virtual resource location in the virtual resource location area, a QoS requirement of the VNF instance can be met, to ensure user experience when a user accesses the VNF instance.

The foregoing VNF for implementing the edge application may be referred to as a virtualized edge application. Correspondingly, the QoS attribute of the VNF herein may be a QoS attribute of the edge application. For example, the QoS attribute may include at least one of the following: a network latency, a throughput, a jitter, a packet loss rate, and the like. The foregoing edge cloud may be a predetermined edge cloud on which the VNF is to be deployed, that is, the VNF is instantiated on the predetermined edge cloud. That is, the foregoing target virtual resource location area is located on the predetermined edge cloud.

In addition, the VNF instantiation method provided in the embodiments includes but is not limited to the foregoing scenario in which an edge application is deployed on an edge cloud, and is also applicable to a scenario in which another VNF instance with a QoS attribute is deployed on an edge cloud, a scenario in which a VNF instance with a QoS attribute is deployed on another cloud (for example, a central cloud), and the like.

The following describes in detail technical aspects of embodiments with reference to specific embodiments. The following several specific embodiments may be combined with each other, and same or similar concepts or processes may not be described in detail in some embodiments.

Figure 3:
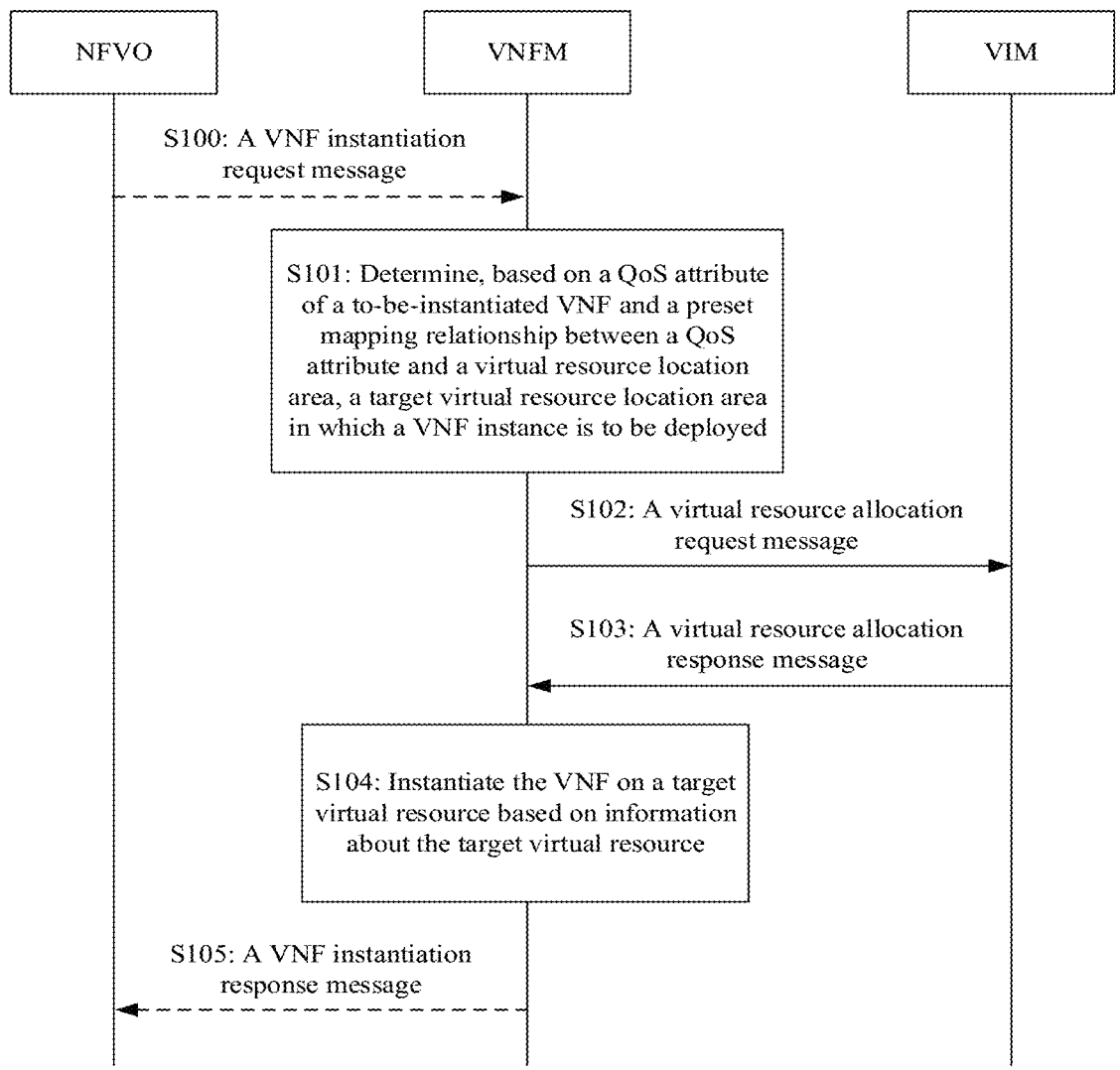
FIG. 3 is a schematic flowchart of a VNF instantiation method according to an embodiment.

FIG. 3 is a schematic flowchart of a VNF instantiation method according to an embodiment. As shown in FIG. 3, this embodiment relates to a process in which a VNFM dynamically matches, based on a QoS attribute of a VNF, a location area that meets the QoS attribute of the VNF for the VNF. As shown in FIG. 3, the method includes the following steps.

S101: A VNFM determines, based on a QoS attribute of a to-be-instantiated VNF and a preset mapping relationship between a QoS attribute and a virtual resource location area, a target virtual resource location area in which a VNF instance is to be deployed.

S102: The VNFM sends a virtual resource allocation request message to a VIM.

Correspondingly, the VIM receives the virtual resource allocation request message. The virtual resource allocation request message requests to allocate a virtual resource on which the VNF instance is to be deployed. The virtual resource allocation request message carries information about the target virtual resource location area.

S103: The VIM sends a virtual resource allocation response message to the VNFM.

The VNFM receives the virtual resource allocation response message. The virtual resource allocation response message indicates information about a target virtual resource on which the VNF instance is to be deployed. The target virtual resource is located in the target virtual resource location area determined by the VNFM.

S104: The VNFM instantiates the VNF on the target virtual resource based on the information about the target virtual resource.

Optionally, before step S101, the method may further include the following step.

Step S100: An NFVO sends a VNF instantiation request message to the VNFM.

Correspondingly, the VNFM receives the VNF instantiation request message. The VNF instantiation request message requests to instantiate the VNF. In this embodiment, a manner of triggering the NFVO to perform a VNF instantiation procedure is not limited. For example, an upper layer (for example, an OSS/BSS system) may trigger the NFVO to perform the VNF instantiation procedure, that is, trigger the NFVO to send the VNF instantiation request message to the VNFM.

Optionally, the VNF instantiation request message may carry an identifier of the to-be-instantiated VNF, an identifier of a VNF deployment flavor, external virtual link information of the VNF, and the like. Because a VNF instance on an edge cloud no longer belongs to an NS instance, the VNF instantiation request message does not trigger a VNF lifecycle management granting request message, that is, the VNFM does not allow or reject a to-be-performed VNF lifecycle management operation by using the NFVO based on a dependency relationship between members in an NS instance, in other words, the VNF instantiation request message does not carry an affinity rule and/or an anti-affinity rule required for deploying the VNF.

In this implementation, after step S104, the method may further include the following step.

Step S105: The VNFM sends a VNF instantiation response message to the NFVO.

Correspondingly, the NFVO receives the VNF instantiation response message. The VNF instantiation response message indicates that deployment of the VNF instance is completed.

In this embodiment, the preset mapping relationship between a QoS attribute and a virtual resource location area may be a mapping relationship between a QoS attribute and a virtual resource location area on an edge cloud on which the VNF instance is to be deployed. The mapping relationship is pre-established, so that different virtual resource location areas on the edge cloud can have different network characteristics, to meet QoS requirements of VNF instances deployed in the location areas. In a possible implementation, for example, the foregoing preset mapping relationship between a QoS attribute and a virtual resource location area may be shown in Table 1.

TABLE 1

| Sequence number | Virtual resource location area | QoS attribute |
|---|---|---|
| 1 | Resource location area identifier 1 | {QoS attribute 1, value range}, {QoS attribute 2, value range}, {QoS attribute 3, value range} |
| 2 | Resource location area identifier 2 | {QoS attribute 4, value range}, {QoS attribute 5, value range} |
| ... | ... | ... |
| n | Resource location area identifier n | {QoS attribute m, value range}, {QoS attribute m + 1, value range}, {QoS attribute m + 2, value range}, {QoS attribute m + 3, value range} |

TABLE 1-continued

| Sequence number | Virtual resource location area | QoS attribute |
|---|---|---|

Both n and m are positive integers. Each resource location area may correspond to at least one QoS attribute. A value range of each QoS attribute includes a value range of each parameter included in the QoS attribute. The value range of each parameter may be continuous or discontinuous. When one resource location area corresponds to a plurality of QoS attributes, the parameters included in the QoS attributes are different, or some parameters included in the QoS attributes are different, and value ranges of same parameters are the same or different.

For example, the QoS attribute 1 and the QoS attribute 2 are used as examples. It is assumed that parameters included in a QoS attribute include a network latency, a throughput, a jitter, and a packet loss rate. The QoS attribute 1 includes two parameters: a network latency and a throughput, and the QoS attribute 2 includes two parameters: a jitter and a packet loss rate. Alternatively, the QoS attribute 1 includes three parameters: a network latency, a throughput, and a jitter, and the QoS attribute 2 includes three parameters: a throughput, a jitter, and a packet loss rate. A value range of the throughput in the QoS attribute 1 is the same as or different from a value range of the throughput in the QoS attribute 2.

One virtual resource location area described in this embodiment may include at least one virtual resource on which a VNF instance can be deployed. For descriptions of the virtual resource location area, refer to the foregoing descriptions of the location area. Details are not described herein again.

In this embodiment, the VNFM stores the preset mapping relationship between a QoS attribute and a virtual resource location area, or the VNFM may obtain the preset mapping relationship between a QoS attribute and a virtual resource location area from a side of another functional module (for example, the NFVO) in an NFV-MANO system structure framework. When the VNFM is to instantiate a VNF, the VNFM may select, from the preset mapping relationship between a QoS attribute and a virtual resource based on a QoS attribute of the to-be-instantiated VNF and the mapping relationship, a virtual resource location area that meets the QoS attribute of the to-be-instantiated VNF, and use the virtual resource location area as a target virtual resource location area in which a VNF instance is to be deployed.

In this way, after the VNFM adds information about the target virtual resource location area to a virtual resource allocation request message and sends the virtual resource allocation request message to the VIM, the VIM may select, from the target virtual resource location area, a target virtual resource on which the VNF instance is to be deployed, so that the VNFM can instantiate the VNF on the target virtual resource. In this manner, the VNF instance can be deployed on the target virtual resource that can meet the QoS attribute of the VNF, so that user experience can be ensured when a user accesses the VNF instance.

A manner of obtaining the QoS attribute of the to-be-instantiated VNF by the VNFM is not limited in this embodiment. For example, the VNF instantiation request message from the NFVO may carry the QoS attribute of the to-be-instantiated VNF. For another example, the QoS attribute of the VNF is added to a VNFD. In this way, the VNFM may obtain the QoS attribute of the VNF from the VNFD.

In this implementation, the VNF instantiation request message from the NFVO may not carry the QoS attribute of the to-be-instantiated VNF.

In a possible implementation, the VNF instantiation request message from the NFVO may further carry indication information. The indication information is used to indicate to determine a target virtual resource location area for the to-be-instantiated VNF in a best effort manner when there is no virtual resource location area that meets the QoS attribute of the to-be-instantiated VNF. In this implementation, in the following cases, the VNFM may determine a target virtual resource location area for the to-be-instantiated VNF in the following manners. Details are as follows.

In a first case, when the VNFM does not find, from the preset mapping relationship between a QoS attribute and a virtual resource location area, a virtual resource location area that matches the QoS attribute of the to-be-instantiated VNF, downgrade processing (for example, downgrade by one order or two orders) may be performed on the QoS attribute of the to-be-instantiated VNF, to search the preset mapping relationship between a QoS attribute and a virtual resource location area for a virtual resource location area that matches a QoS attribute obtained through downgrade processing, and use the virtual resource location area as a target virtual resource location area in which the VNF instance is to be deployed. The downgrade herein may be downgrading an insignificant parameter in the QoS attribute, for example, downgrading a packet loss rate from 2% to 4%, or downgrading the parameters in the QoS attribute.

Alternatively, when the VNFM does not find, from the preset mapping relationship between a QoS attribute and a virtual resource location area, a virtual resource location area that matches the QoS attribute of the to-be-instantiated VNF, upgrade processing (for example, upgrade by one order or two orders) may be performed on the QoS attribute of the to-be-instantiated VNF, to obtain a target virtual resource location area in which the VNF instance is to be deployed. The implementation and technical means are similar to those of the downgrade processing. Details are not described herein again.

In a second case, after the VNFM determines a target virtual resource location area from the preset mapping relationship between a QoS attribute and a virtual resource location area, if the VNFM finds, in a process of interacting with the VIM, that no available resource in the target virtual resource location area can be used to deploy the VNF instance, the VNFM may further redetermine a target virtual resource location area in the foregoing downgrade or upgrade manner, and interact with the VIM based on the redetermined target virtual resource location area to determine a target virtual resource location at which the VNF instance is to be deployed.

In the foregoing manners, when there is no virtual resource location area that meets the QoS attribute of the to-be-instantiated VNF, a virtual resource location area corresponding to a QoS attribute that is not substantially different from the QoS attribute of the VNF may be allocated to the to-be-instantiated VNF. In this way, after the VNF instance is deployed in the virtual resource location area, actual experience of accessing the VNF instance by a user may not substantially deviate from QoS of the VNF instance, thereby ensuring user experience.

According to the VNF instantiation method provided in this embodiment, a mapping relationship between a different virtual resource location area on an edge cloud and the QoS attribute is established, so that a virtual resource location area that meets a QoS attribute of a VNF can be dynamically matched for the VNF based on the QoS attribute of the VNF. In this way, after a VNF instance is deployed in the virtual resource location area, a QoS requirement of the VNF instance can be met, to ensure user experience when a user accesses the VNF instance.

Figure 4:
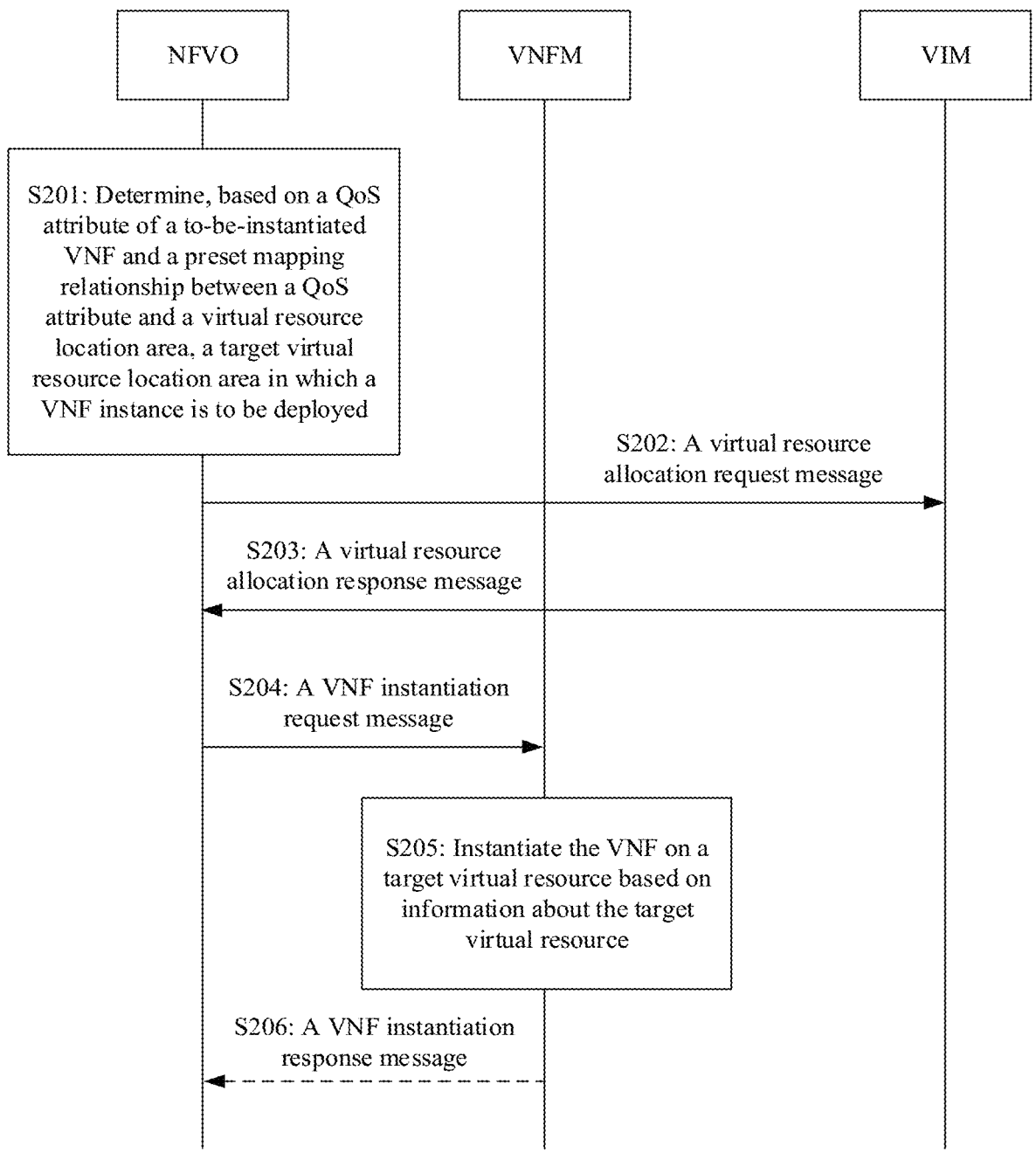
FIG. 4 is a schematic flowchart of another VNF instantiation method according to an embodiment.

FIG. 4 is a schematic flowchart of another VNF instantiation method according to an embodiment. This embodiment relates to a process in which an NFVO dynamically matches, based on a QoS attribute of a VNF, a location area that meets the QoS attribute of the VNF for the VNF. As shown in FIG. 4, the method includes the following steps.

S201: An NFVO determines, based on a QoS attribute of a to-be-instantiated VNF and a preset mapping relationship between a QoS attribute and a virtual resource location area, a target virtual resource location area in which a VNF instance is to be deployed.

In this embodiment, a manner of triggering the NFVO to perform a VNF instantiation procedure is not limited. For example, an upper layer (for example, an OSS/BSS system) may trigger the NFVO to perform the VNF instantiation procedure.

S202: The NFVO sends a virtual resource allocation request message to a VIM.

Correspondingly, the VIM receives the virtual resource allocation request message. The virtual resource allocation request message requests to allocate a virtual resource on which the VNF instance is to be deployed. The virtual resource allocation request message carries information about the target virtual resource location area determined by the NFVO.

S203: The VIM sends a virtual resource allocation response message to the NFVO.

Correspondingly, the NFVO receives the virtual resource allocation response message. The virtual resource allocation response message indicates information about a target virtual resource on which the VNF instance is to be deployed. The target virtual resource is located in the target virtual resource location area.

S204: The NFVO sends a VNF instantiation request message to a VNFM.

Correspondingly, the VNFM receives the VNF instantiation request message. The VNF instantiation request message requests to instantiate the VNF. The VNF instantiation request message carries the information about the target virtual resource.

Optionally, the VNF instantiation request message may further carry an identifier of the to-be-instantiated VNF, an identifier of a VNF deployment flavor, external virtual link information of the VNF, and the like. Because a VNF instance on an edge cloud no longer belongs to an NS instance, the VNF instantiation request message does not trigger a VNF lifecycle management granting request message, that is, the VNFM does not allow or reject a to-be-performed VNF lifecycle management operation by using the NFVO based on a dependency relationship between members in an NS instance, in other words, the VNF instantiation request message does not carry an affinity rule and/or an anti-affinity rule required for deploying a VNF.

S205: The VNFM instantiates the VNF on the target virtual resource based on the information about the target virtual resource.

In a possible implementation, after step S205, the method may further include the following step.

Step S206: The VNFM sends a VNF instantiation response message to the NFVO.

Correspondingly, the NFVO receives the VNF instantiation response message. The VNF instantiation response message indicates that deployment of the VNF instance is completed.

In this embodiment, the NFVO stores the preset mapping relationship between a QoS attribute and a virtual resource location area, or the NFVO may obtain the preset mapping relationship between a QoS attribute and a virtual resource location area from a side of another functional module (for example, the VNFM) in an NFV-MANO system structure framework. When the NFVO triggers instantiation of a VNF, the NFVO may select, from the preset mapping relationship between a QoS attribute and a virtual resource based on a QoS attribute of the to-be-instantiated VNF and the mapping relationship, a virtual resource location area that meets the QoS attribute of the to-be-instantiated VNF, and use the virtual resource location area as a target virtual resource location area in which a VNF instance is to be deployed. For how the NFVO selects, from the preset mapping relationship between a QoS attribute and a virtual resource based on the QoS attribute of the to-be-instantiated VNF and the mapping relationship, a virtual resource location area that meets the QoS attribute of the to-be-instantiated VNF, refer to the descriptions of determining the target virtual resource location area by the VNFM based on the mapping relationship in the embodiment in FIG. 3. Details are not described herein again.

In this way, after the NFVO adds information about the target virtual resource location area to a virtual resource allocation request message and sends the virtual resource allocation request message to the VIM, the VIM may select, from the target virtual resource location area, a target virtual resource on which the VNF instance is to be deployed, so that the NFVO can trigger, by using a VNF instantiation request message, the VNFM to instantiate the VNF on the target virtual resource. In this manner, the VNF instance can be deployed on the target virtual resource that can meet the QoS attribute of the VNF, so that user experience can be ensured when a user accesses the VNF instance.

A manner of obtaining the QoS attribute of the to-be-instantiated VNF by the NFVO is not limited in this embodiment. For example, the QoS attribute of the VNF may be added to a VNFD/NSD. In this way, the NFVO may obtain the QoS attribute of the VNF from the VNFD/NSD.

In a possible implementation, when the NFVO determines a target virtual resource location area for the to-be-instantiated VNF, if the first case and the second case described in the embodiment of FIG. 3 occur, the NFVO may also determine a target virtual resource location area for the to-be-instantiated VNF in a best effort manner. The implementation is similar, and details are not described herein again. In this manner, when there is no virtual resource location area that meets the QoS attribute of the to-be-instantiated VNF, a virtual resource location area corresponding to a QoS attribute that is not substantially different from the QoS attribute of the VNF may be allocated to the to-be-instantiated VNF. In this way, after the VNF instance is deployed in the virtual resource location area, actual experience of accessing the VNF instance by a user may not substantially deviate from QoS of the VNF instance, thereby ensuring user experience.

According to the VNF instantiation method provided in this embodiment, a mapping relationship between a different virtual resource location area on an edge cloud and the QoS attribute is established, so that a virtual resource location area that meets a QoS attribute of a VNF can be dynamically matched for the VNF based on the QoS attribute of the VNF. In this way, after a VNF instance is deployed in the virtual resource location area, a QoS requirement of the VNF instance can be met, to ensure user experience when a user accesses the VNF instance.

Figure 5:
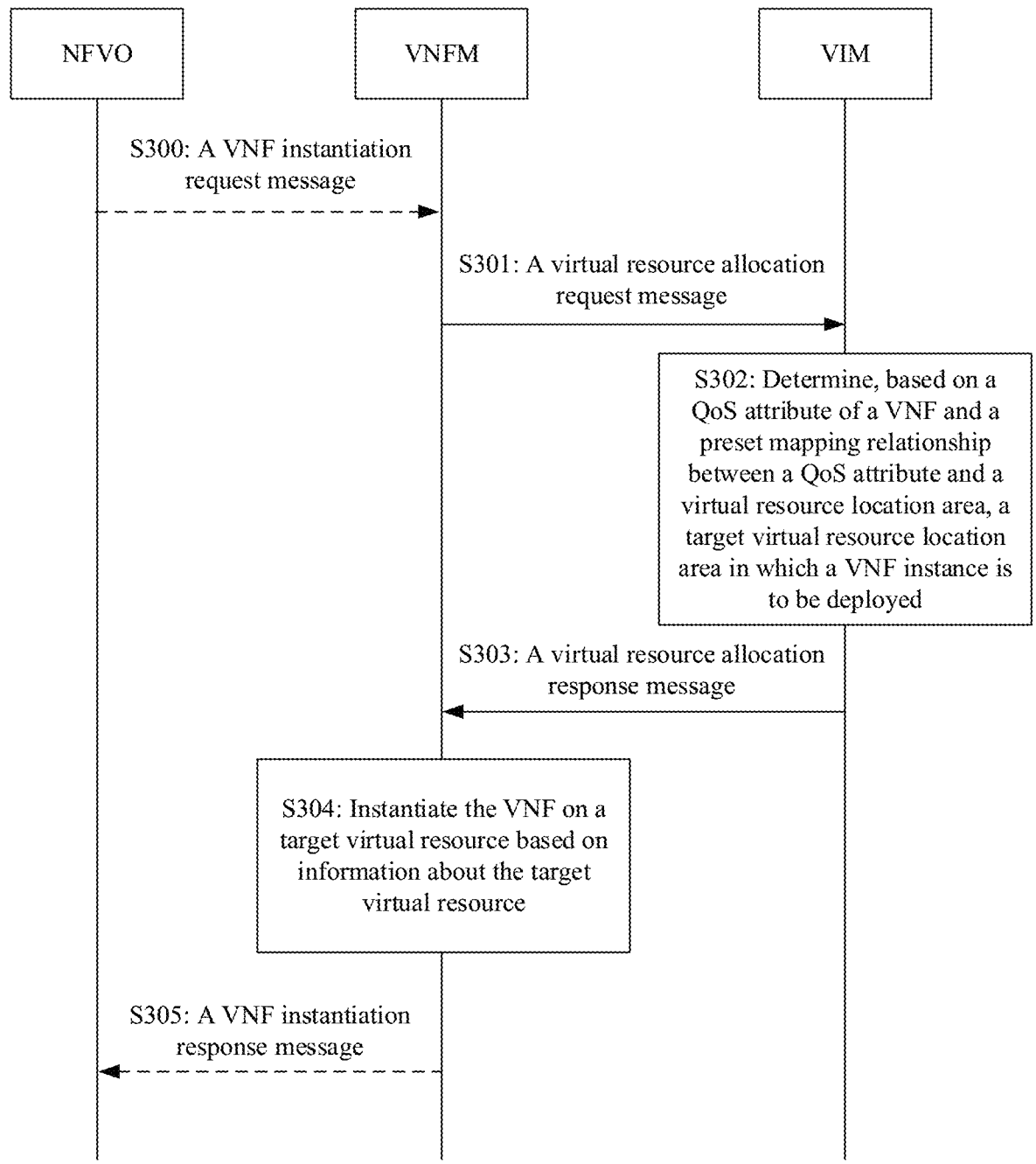
FIG. 5 is a schematic flowchart of still another VNF instantiation method according to an embodiment.

FIG. 5 is a schematic flowchart of still another VNF instantiation method according to an embodiment. This embodiment relates to a process in which a VIM dynamically matches, based on a QoS attribute of a VNF, a location area that meets the QoS attribute of the VNF for the VNF. As shown in FIG. 5, the method includes the following steps.

S301: A VNFM sends a virtual resource allocation request message to a VIM.

Correspondingly, the VIM receives the virtual resource allocation request message. The virtual resource allocation request message requests to allocate a virtual resource on which a VNF instance is to be deployed. The virtual resource allocation request message carries a QoS attribute of a VNF.

S302: The VIM determines, based on the QoS attribute of the VNF and a preset mapping relationship between a QoS attribute and a virtual resource location area, a target virtual resource location area in which the VNF instance is to be deployed.

S303: The VIM sends a virtual resource allocation response message to the VNFM.

Correspondingly, the VNFM receives the virtual resource allocation response message. The virtual resource allocation response message indicates information about a target virtual resource on which the VNF instance is to be deployed. The target virtual resource is located in the target virtual resource location area.

S304: The VNFM instantiates the VNF on the target virtual resource based on the information about the target virtual resource.

Optionally, before step S301, the method may further include the following step.

S300: An NFVO sends a VNF instantiation request message to the VNFM.

Correspondingly, the VNFM receives the VNF instantiation request message. The VNF instantiation request message requests to instantiate the VNF. In this embodiment, a manner of triggering the NFVO to perform a VNF instantiation procedure is not limited. For example, an upper layer (for example, an OSS/BSS system) may trigger the NFVO to perform the VNF instantiation procedure, that is, trigger the NFVO to send the VNF instantiation request message to the VNFM.

Optionally, the VNF instantiation request message may carry an identifier of the to-be-instantiated VNF, an identifier of a VNF deployment flavor, external virtual link information of the VNF, and the like. Because a VNF instance on an edge cloud no longer belongs to an NS instance, the VNF instantiation request message does not trigger a VNF lifecycle management granting request message, that is, the VNFM does not allow or reject a to-be-performed VNF lifecycle management operation by using the NFVO based on a dependency relationship between members in an NS instance, in other words, the VNF instantiation request message does not carry an affinity rule and/or an anti-affinity rule required for deploying a VNF.

In this implementation, after step S304, the method may further include the following step.

Step S305: The VNFM sends a VNF instantiation response message to the NFVO.

Correspondingly, the NFVO receives the VNF instantiation response message. The VNF instantiation response message indicates that deployment of the VNF instance is completed.

In this embodiment, the VIM stores the preset mapping relationship between a QoS attribute and a virtual resource location area, or the VIM may obtain the preset mapping relationship between a QoS attribute and a virtual resource location area from a side of another functional module (for example, the VNFM) in an NFV-MANO system structure framework. When receiving the virtual resource allocation request message from the VNFM, the VIM may select, from the preset mapping relationship between a QoS attribute and a virtual resource based on the QoS attribute of the to-be-instantiated VNF and the mapping relationship, a virtual resource location area that meets the QoS attribute of the to-be-instantiated VNF, and use the virtual resource location area as a target virtual resource location area in which the VNF instance is to be deployed. For how the VIM selects, from the preset mapping relationship between a QoS attribute and a virtual resource based on the QoS attribute of the to-be-instantiated VNF and the mapping relationship, a virtual resource location area that meets the QoS attribute of the to-be-instantiated VNF, refer to the descriptions of determining the target virtual resource location area by the VNFM based on the mapping relationship in the embodiment in FIG. 3. Details are not described herein again.

In this way, after determining the target virtual resource location area in which the VNF instance is to be deployed, the VIM may select, from the target virtual resource location area, a target virtual resource on which the VNF instance is to be deployed, and feed back the target virtual resource to the VNFM, so that the VNFM instantiates the VNF on the target virtual resource. In this manner, the VNF instance can be deployed on the target virtual resource that can meet the QoS attribute of the VNF, so that user experience can be ensured when a user accesses the VNF instance.

In a possible implementation, when the VIM determines a target virtual resource location area for the to-be-instantiated VNF, if the first case and the second case described in the embodiment of FIG. 3 occur, the VIM may also determine a target virtual resource location area for the to-be-instantiated VNF in a best effort manner. An implementation thereof is similar, and details are not described herein again. In this manner, when there is no virtual resource location area that meets the QoS attribute of the to-be-instantiated VNF, a virtual resource location area corresponding to a QoS attribute that is not substantially different from the QoS attribute of the VNF may be allocated to the to-be-instantiated VNF. In this way, after the VNF instance is deployed in the virtual resource location area, actual experience of accessing the VNF instance by a user may not substantially deviate from QoS of the VNF instance, thereby ensuring user experience.

According to the VNF instantiation method provided in this embodiment, a mapping relationship between a different virtual resource location area on an edge cloud and the QoS attribute is established, so that a virtual resource location area that meets a QoS attribute of a VNF can be dynamically matched for the VNF based on the QoS attribute of the VNF. In this way, after a VNF instance is deployed in the virtual resource location area, a QoS requirement of the VNF instance can be met, to ensure user experience when a user accesses the VNF instance.

Figure 6:
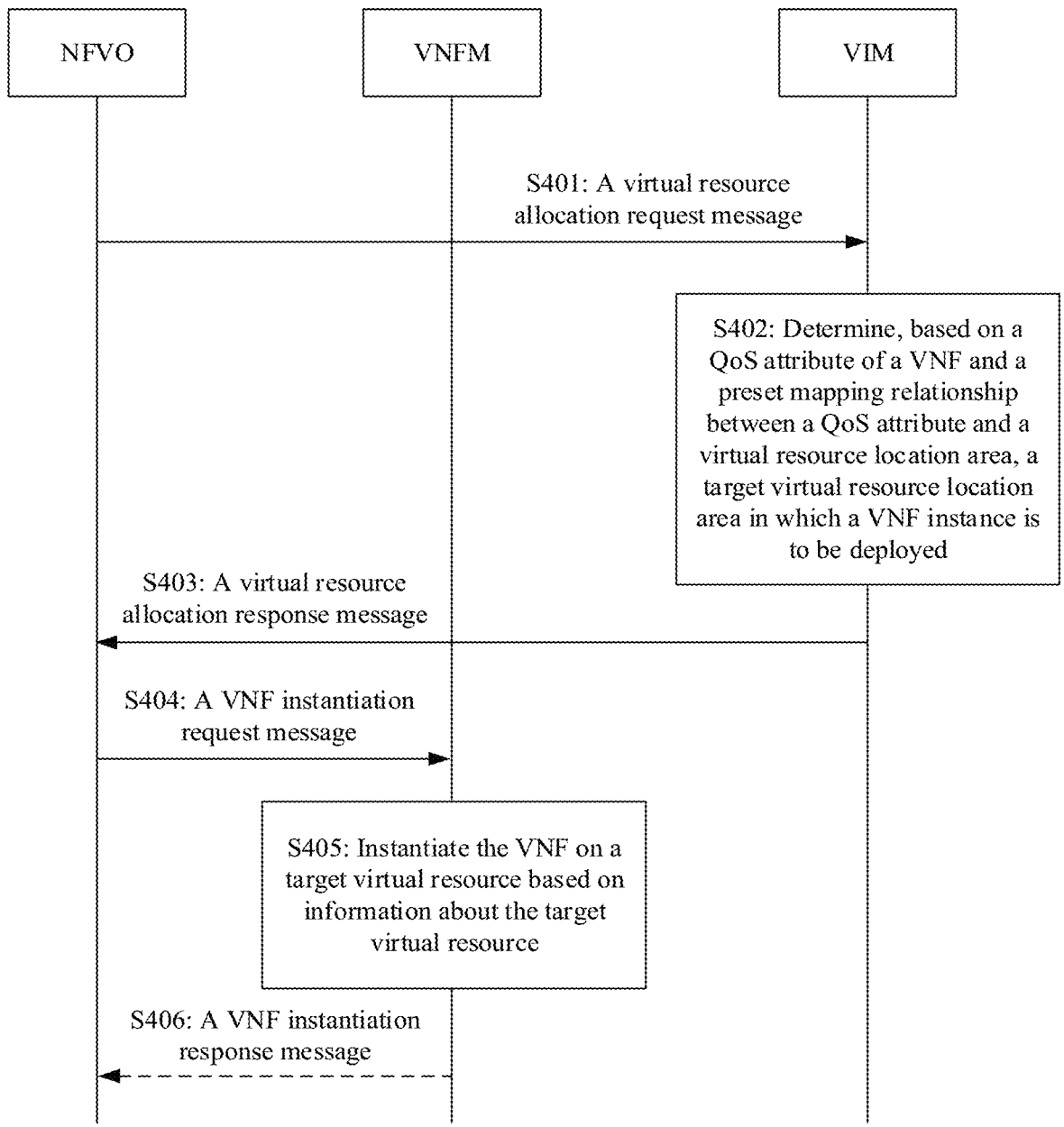
FIG. 6 is a schematic flowchart of still another VNF instantiation method according to an embodiment.

FIG. 6 is a schematic flowchart of still another VNF instantiation method according to an embodiment. This embodiment relates to a process in which a VIM dynamically matches, based on a QoS attribute of a VNF, a location area that meets the QoS attribute of the VNF for the VNF. A difference between this embodiment and the embodiment shown in FIG. 5 lies in that an NFVO triggers the VIM to perform the procedure. As shown in FIG. 6, the method includes the following steps.

S401: An NFVO sends a virtual resource allocation request message to a VIM.

Correspondingly, the VIM receives the virtual resource allocation request message. The virtual resource allocation request message requests to allocate a virtual resource on which a VNF instance is to be deployed. The virtual resource allocation request message carries a QoS attribute of a VNF.

In this embodiment, a manner of triggering the NFVO to perform a VNF instantiation procedure is not limited. For example, an upper layer (for example, an OSS/BSS system) may trigger the NFVO to perform the VNF instantiation procedure.

S402: The VIM determines, based on the QoS attribute of the VNF and a preset mapping relationship between a QoS attribute and a virtual resource location area, a target virtual resource location area in which the VNF instance is to be deployed.

S403: The VIM sends a virtual resource allocation response message to the NFVO.

Correspondingly, the NFVO receives the virtual resource allocation response message. The virtual resource allocation response message indicates information about a target virtual resource on which the VNF instance is to be deployed. The target virtual resource is located in the target virtual resource location area.

S404: The NFVO sends a VNF instantiation request message to a VNFM.

Correspondingly, the VNFM receives the VNF instantiation request message. The VNF instantiation request message requests to instantiate the VNF. The VNF instantiation request message carries the information about the target virtual resource.

Optionally, the VNF instantiation request message may further carry an identifier of the to-be-instantiated VNF, an identifier of a VNF deployment flavor, external virtual link information of the VNF, and the like. Because a VNF instance on an edge cloud no longer belongs to an NS instance, the VNF instantiation request message does not trigger a VNF lifecycle management granting request message, that is, the VNFM does not allow or reject a to-be-performed VNF lifecycle management operation by using the NFVO based on a dependency relationship between members in an NS instance, in other words, the VNF instantiation request message does not carry an affinity rule and/or an anti-affinity rule required for deploying a VNF.

S405: The VNFM instantiates the VNF on the target virtual resource based on the information about the target virtual resource.

In a possible implementation, after step S405, the method may further include the following step.

Step S406: The VNFM sends a VNF instantiation response message to the NFVO.

Correspondingly, the NFVO receives the VNF instantiation response message. The VNF instantiation response message indicates that deployment of the VNF instance is completed.

In this embodiment, the VIM stores the preset mapping relationship between a QoS attribute and a virtual resource location area, or the VIM may obtain the preset mapping relationship between a QoS attribute and a virtual resource location area from a side of another functional module (for example, the VNFM) in an NFV-MANO system structure framework. When receiving the virtual resource allocation request message from the NFVO, the VIM may select, from the preset mapping relationship between a QoS attribute and a virtual resource based on the QoS attribute of the to-be-instantiated VNF and the mapping relationship, a virtual resource location area that meets the QoS attribute of the to-be-instantiated VNF, and use the virtual resource location area as a target virtual resource location area in which the VNF instance is to be deployed. For how the VIM selects, from the preset mapping relationship between a QoS attribute and a virtual resource based on the QoS attribute of the to-be-instantiated VNF and the mapping relationship, a virtual resource location area that meets the QoS attribute of the to-be-instantiated VNF, refer to the descriptions of determining the target virtual resource location area by the VNFM based on the mapping relationship in the embodiment in FIG. 3. Details are not described herein again.

In this way, after determining the target virtual resource location area in which the VNF instance is to be deployed, the VIM may select, from the target virtual resource location area, a target virtual resource on which the VNF instance is to be deployed, and feed back the target virtual resource to the NFVO, so that the NFVO triggers the VNFM to instantiate the VNF on the target virtual resource. In this manner, the VNF instance can be deployed on the target virtual resource that can meet the QoS attribute of the VNF, so that user experience can be ensured when a user accesses the VNF instance.

In a possible implementation, when the VIM determines a target virtual resource location area for the to-be-instantiated VNF, if the first case and the second case described in the embodiment of FIG. 3 occur, the VIM may also determine a target virtual resource location area for the to-be-instantiated VNF in a best effort manner. An implementation thereof is similar, and details are not described herein again. In this manner, when there is no virtual resource location area that meets the QoS attribute of the to-be-instantiated VNF, a virtual resource location area corresponding to a QoS attribute that is not substantially different from the QoS attribute of the VNF may be allocated to the to-be-instantiated VNF. In this way, after the VNF instance is deployed in the virtual resource location area, actual experience of accessing the VNF instance by a user may not substantially deviate from QoS of the VNF instance, thereby ensuring user experience.

According to the VNF instantiation method provided in this embodiment, a mapping relationship between a different virtual resource location area on an edge cloud and the QoS attribute is established, so that a virtual resource location area that meets a QoS attribute of a VNF can be dynamically matched for the VNF based on the QoS attribute of the VNF. In this way, after a VNF instance is deployed in the virtual resource location area, a QoS requirement of the VNF instance can be met, to ensure user experience when a user accesses the VNF instance.

In the foregoing method embodiments, interaction between the NFVO, the VNFM, and the VIM in the NFV-MANO system structure framework shown in FIG. 1 is used as an example to describe the VNF instantiation method provided in the embodiments. However, a person skilled in the art can understand that, with evolution of the NFV-MANO system structure framework, any functional module capable of triggering VNF instantiation, for example, a multi-access edge platform manager-NFV (MEPM-V) on an edge cloud, may implement the foregoing embodiments in the foregoing manners. Because a function of the MPEM-V is similar to that of the VNFM, in the foregoing method embodiments, the MEPM-V, instead of the VNFM, may be alternatively used to interact with the NFVO and the VIM to implement the foregoing method embodiments. A principle and a technical effect thereof are similar, and details are not described herein again.

Figure 7:
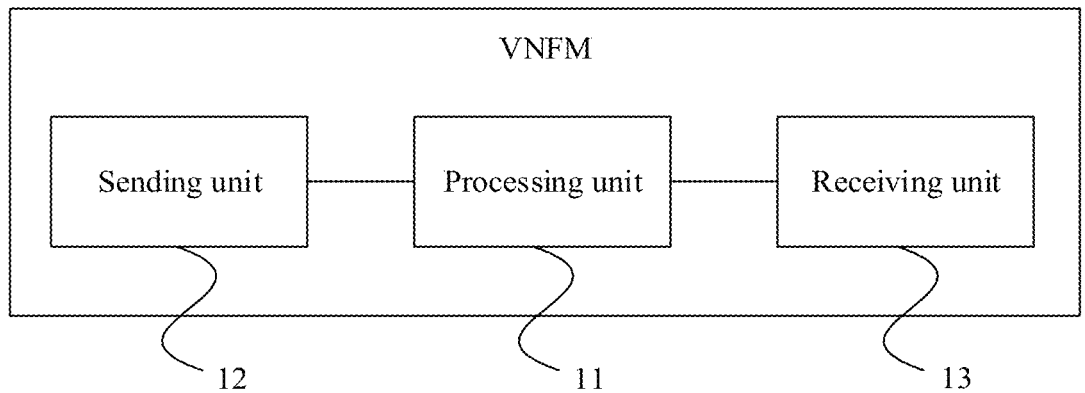
FIG. 7 is a schematic diagram of a structure of a VNFM according to an embodiment.

FIG. 7 is a schematic diagram of a structure of a VNFM according to an embodiment. As shown in FIG. 7, the VNFM may include a processing unit 11, a sending unit 12, and a receiving unit 13.

The processing unit 11 is configured to determine, based on a QoS attribute of a to-be-instantiated VNF and a preset mapping relationship between a QoS attribute and a virtual resource location area, a target virtual resource location area in which a VNF instance is to be deployed.

The sending unit 12 is configured to send a virtual resource allocation request message to a VIM. The virtual resource allocation request message requests to allocate a virtual resource on which the VNF instance is to be deployed. The virtual resource allocation request message carries information about the target virtual resource location area.

The receiving unit 13 is configured to receive a virtual resource allocation response message from the VIM. The virtual resource allocation response message indicates information about a target virtual resource on which the VNF instance is to be deployed. The target virtual resource is located in the target virtual resource location area.

The processing unit 11 is further configured to instantiate the VNF on the target virtual resource based on the information about the target virtual resource.

In a possible implementation, the receiving unit 13 is further configured to receive a VNF instantiation request message from an NFVO before the processing unit 11 determines the target virtual resource location area in which the VNF instance is to be deployed. The VNF instantiation request message requests to instantiate the VNF. In this implementation, the QoS attribute of the VNF may be obtained in the following two manners. The VNF instantiation request message carries the QoS attribute of the VNF. Alternatively, the processing unit 11 is further configured to obtain the QoS attribute of the VNF from a VNFD before determining the target virtual resource location area in which the VNF instance is to be deployed.

In a possible implementation, the VNF instantiation request message does not trigger a VNF lifecycle management granting request message, or does not carry an affinity rule and/or an anti-affinity rule for deploying the VNF.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VNFM provided in this embodiment is capable of performing the actions of the VNFM in the method embodiment shown in FIG. 3. An implementation principle and a technical effect thereof are similar, and details are not described herein again.

According to another aspect, an embodiment further provides an NFVO. The NFVO includes a sending unit. The sending unit is configured to send a VNF instantiation request message to a VNFM. The VNF instantiation request message requests to instantiate a VNF.

In a possible implementation, the VNF instantiation request message may carry a QoS attribute of the VNF.

In a possible implementation, the VNF instantiation request message does not trigger a VNF lifecycle management granting request message, or does not carry an affinity rule and/or an anti-affinity rule for deploying the VNF.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The NFVO provided in this embodiment is capable of performing the actions of the NFVO in the method embodiment shown in FIG. 3 or FIG. 5. An implementation principle and a technical effect thereof are similar, and details are not described herein again.

Figure 8:
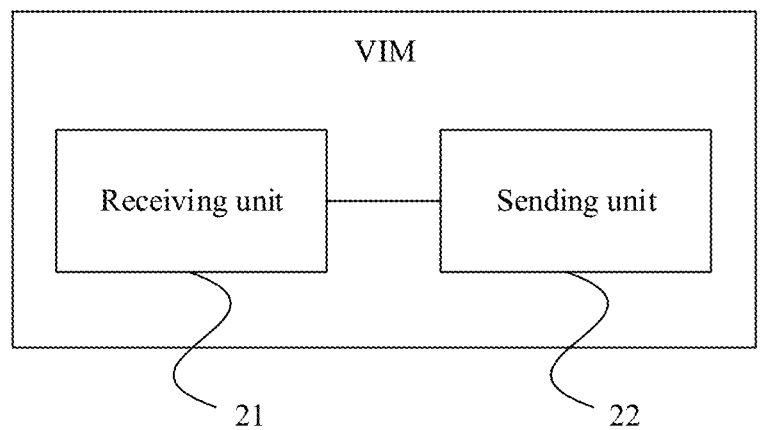
FIG. 8 is a schematic diagram of a structure of a VIM according to an embodiment.

FIG. 8 is a schematic diagram of a structure of a VIM according to an embodiment. As shown in FIG. 8, the VIM may include a receiving unit 21 and a sending unit 22.

The receiving unit 21 is configured to receive a virtual resource allocation request message from a VNFM. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF.

The sending unit 22 is configured to send a virtual resource allocation response message to the VNFM. The virtual resource allocation response message indicates information about a target virtual resource. The target virtual resource is located in the target virtual resource location area.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VIM provided in this embodiment is capable of performing the actions of the VIM in the method embodiment shown in FIG. 3. An implementation principle and a technical effect thereof are similar, and details are not described herein again.

Figure 9:
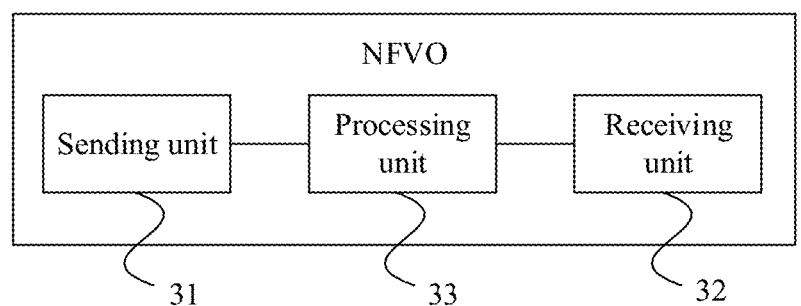
FIG. 9 is a schematic diagram of a structure of an NFVO according to an embodiment.

FIG. 9 is a schematic diagram of a structure of an NFVO according to an embodiment. As shown in FIG. 9, the NFVO may include a sending unit 31 and a receiving unit 32. Optionally, the NFVO may further include a processing unit 33.

In a possible implementation, the sending unit 31 is configured to send a virtual resource allocation request message to a VIM, where the virtual resource allocation request message requests to allocate a virtual resource on which a VNF instance is to be deployed, and the virtual resource allocation request message carries a QoS attribute of a VNF, the receiving unit 32 is configured to receive a virtual resource allocation response message from the VIM, where the virtual resource allocation response message indicates information about a target virtual resource on which the VNF instance is to be deployed, the target virtual resource is located in a target virtual resource location area, and the target virtual resource location area is a virtual resource location area corresponding to the QoS attribute of the VNF, and the sending unit 31 is further configured to send a VNF instantiation request message to a VNFM, where the VNF instantiation request message requests to instantiate the VNF, and the VNF instantiation request message carries the information about the target virtual resource.

Alternatively, the processing unit 33 is configured to determine, based on a QoS attribute of a to-be-instantiated VNF and a preset mapping relationship between a QoS attribute and a virtual resource location area, a target virtual resource location area in which a VNF instance is to be deployed, the sending unit 31 is configured to send a virtual resource allocation request message to a VIM, where the virtual resource allocation request message requests to allocate a virtual resource on which the VNF instance is to be deployed, and the virtual resource allocation request message carries information about the target virtual resource location area, the receiving unit 32 is configured to receive a virtual resource allocation response message from the VIM, where the virtual resource allocation response message indicates information about a target virtual resource on which the VNF instance is to be deployed, and the target virtual resource is located in the target virtual resource location area, and the sending unit 31 is further configured to send a VNF instantiation request message to a VNFM, where the VNF instantiation request message requests to instantiate the VNF, and the VNF instantiation request message carries the information about the target virtual resource.

In a possible implementation, the processing unit 33 is further configured to obtain the QoS attribute of the VNF from a VNFD.

In a possible implementation, the VNF instantiation request message does not trigger a VNF lifecycle management granting request message, or does not carry an affinity rule and/or an anti-affinity rule for deploying the VNF.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The NFVO provided in this embodiment is capable of performing the actions of the NFVO in the method embodiment shown in FIG. 4 or FIG. 6. An implementation principle and a technical effect thereof are similar, and details are not described herein again.

Figure 10:
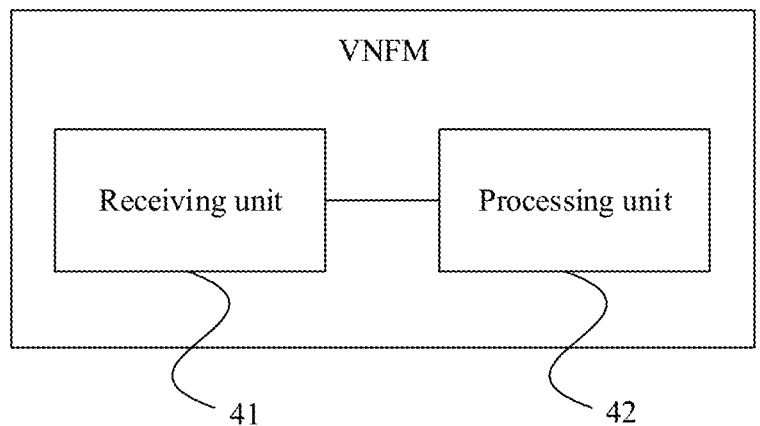
FIG. 10 is a schematic diagram of a structure of another VNFM according to an embodiment.

FIG. 10 is a schematic diagram of a structure of another VNFM according to an embodiment. As shown in FIG. 10, the VNFM may include a receiving unit 41 and a processing unit 42.

The receiving unit 41 is configured to receive a VNF instantiation request message from an NFVO. The VNF instantiation request message requests to instantiate a VNF. The VNF instantiation request message carries information about a target virtual resource. The target virtual resource is located in a target virtual resource location area. The target virtual resource location area is a virtual resource location area corresponding to a QoS attribute of the VNF.

The processing unit 42 is configured to instantiate the VNF on the target virtual resource based on the information about the target virtual resource.

In a possible implementation, the VNF instantiation request message does not trigger a VNF lifecycle management granting request message, or does not carry an affinity rule and/or an anti-affinity rule for deploying the VNF.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VNFM provided in this embodiment is capable of performing the actions of the VNFM in the method embodiment shown in FIG. 4 or FIG. 6. An implementation principle and a technical effect thereof are similar, and details are not described herein again.

Figure 11:
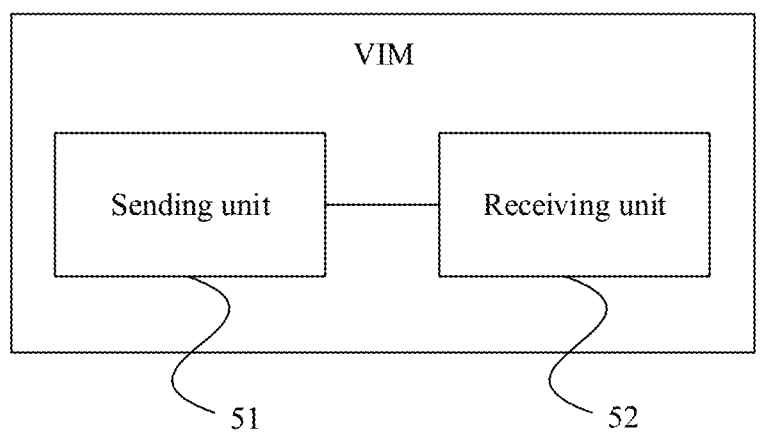
FIG. 11 is a schematic diagram of a structure of another VIM according to an embodiment.

FIG. 11 is a schematic diagram of a structure of another VIM according to an embodiment. As shown in FIG. 11, the VIM may include a sending unit 51 and a receiving unit 52.

The receiving unit 52 is configured to receive a virtual resource allocation request message from an NFVO. The virtual resource allocation request message requests to allocate a virtual resource on which a VNF instance is to be deployed. The virtual resource allocation request message carries information about a target virtual resource location area. The target virtual resource location area is a virtual resource location area corresponding to a QoS attribute of a VNF.

The sending unit 51 is configured to send a virtual resource allocation response message to the NFVO. The virtual resource allocation response message indicates information about a target virtual resource. The target virtual resource is located in the target virtual resource location area.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VIM provided in this embodiment is capable of performing the actions of the VIM in the method embodiment shown in FIG. 4. An implementation principle and a technical effect thereof are similar, and details are not described herein again.

Figure 12:
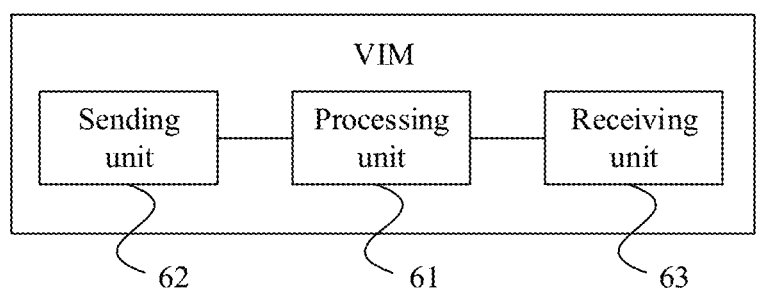
FIG. 12 is a schematic diagram of a structure of still another VIM according to an embodiment.

FIG. 12 is a schematic diagram of a structure of still another VIM according to an embodiment. As shown in FIG. 12, the VIM may include a processing unit 61, a sending unit 62, and a receiving unit 63.

The receiving unit 63 is configured to receive a virtual resource allocation request message sent by a VNFM. The virtual resource allocation request message requests to allocate a virtual resource on which a VNF instance is to be deployed. The virtual resource allocation request message carries a QoS attribute of a VNF.

The processing unit 61 is configured to determine, based on the QoS attribute of the VNF and a preset mapping relationship between a QoS attribute and a virtual resource location area, a target virtual resource location area in which the VNF instance is to be deployed.

The sending unit 62 is configured to send a virtual resource allocation response message to the VNFM. The virtual resource allocation response message indicates information about a target virtual resource on which the VNF instance is to be deployed. The target virtual resource is located in the target virtual resource location area.

Alternatively, the receiving unit 63 is configured to receive a virtual resource allocation request message sent by an NFVO. The virtual resource allocation request message requests to allocate a virtual resource on which a VNF instance is to be deployed. The virtual resource allocation request message carries a QoS attribute of a VNF. Correspondingly, the sending unit 62 is configured to send a virtual resource allocation response message to the NFVO. The virtual resource allocation response message indicates information about a target virtual resource on which the VNF instance is to be deployed. The target virtual resource is located in the target virtual resource location area.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VIM provided in this embodiment is capable of performing the actions of the VIM in the method embodiment shown in FIG. 5 or FIG. 6. An implementation principle and a technical effect thereof are similar, and details are not described herein again.

Figure 13:
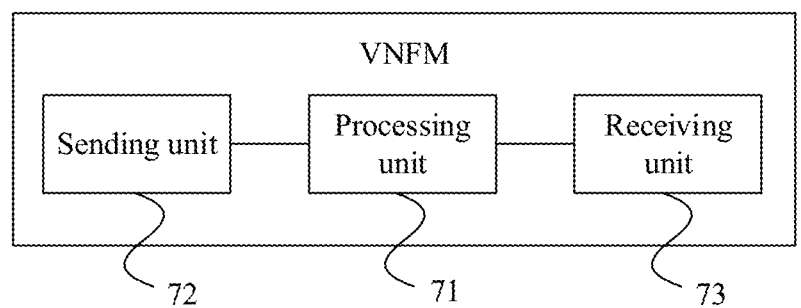
FIG. 13 is a schematic diagram of a structure of still another VNFM according to an embodiment.

FIG. 13 is a schematic diagram of a structure of still another VNFM according to an embodiment. As shown in FIG. 13, the VNFM may include a processing unit 71, a sending unit 72, and a receiving unit 73.

The sending unit 72 is configured to send a virtual resource allocation request message to a VIM. The virtual resource allocation request message requests to allocate a virtual resource on which a VNF instance is to be deployed. The virtual resource allocation request message carries a QoS attribute of a VNF.

The receiving unit 73 is configured to receive a virtual resource allocation response message from the VIM. The virtual resource allocation response message indicates information about a target virtual resource on which the VNF instance is to be deployed. The target virtual resource is located in a target virtual resource location area. The target virtual resource location area is a virtual resource location area corresponding to the QoS attribute of the VNF.

The processing unit 71 is configured to instantiate the VNF on the target virtual resource based on the information about the target virtual resource.

In a possible implementation, the receiving unit 73 is further configured to receive a VNF instantiation request message from an NFVO before the sending unit 72 sends the virtual resource allocation request message to the VIM. The VNF instantiation request message requests to instantiate the VNF. In this implementation, the QoS attribute of the VNF may be obtained in the following two manners. The VNF instantiation request message carries the QoS attribute of the VNF. Alternatively, the processing unit 71 is further configured to obtain the QoS attribute of the VNF from a VNFD before the sending unit 72 sends the virtual resource allocation request message to the VIM.

In a possible implementation, the VNF instantiation request message does not trigger a VNF lifecycle management granting request message, or does not carry an affinity rule and/or an anti-affinity rule for deploying the VNF.

In a possible implementation, the VNF is a virtualized multi-access edge application, the QoS attribute is a QoS attribute of the multi-access edge application, the VNF is instantiated in a predetermined edge data center, and the target virtual resource location area is located in the predetermined edge data center. In this example, the QoS attribute may include at least one of the following: a network latency, a throughput, a jitter, and a packet loss rate.

The VNFM provided in this embodiment is capable of performing the actions of the VNFM in the method embodiment shown in FIG. 5. An implementation principle and a technical effect thereof are similar, and details are not described herein again.

An embodiment further provides a communications system, including an NFVO, a VNFM, and a VIM. The NFVO is configured to perform the actions of the NFVO in the foregoing method embodiments, the VNFM is configured to perform the actions of the VNFM in the foregoing method embodiments, and the VIM is configured to perform the actions of the VIM in the foregoing method embodiments. An implementation principle and a technical effect thereof are similar, and details are not described herein again.

The receiving unit may be a receiver during implementation, and the sending unit may be a transmitter during implementation. The processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may alternatively be stored in a memory of the foregoing apparatus in a form of program code, and is invoked by a processing element of the foregoing apparatus to perform a function of the processing unit. In addition, all or some of the units may be integrated, or may be implemented independently. The processing element herein may be an integrated circuit and has a signal processing capability. In an implementation process, steps of the foregoing method or the foregoing units may be implemented by using a hardware integrated logical circuit in the processing element, or by using instructions in a form of software.

For example, the foregoing units may be one or more integrated circuits configured to implement the foregoing method, for example, one or more application-specific integrated circuits (ASICs), one or more microprocessors (digital signal processors (DSPs)), or one or more field-programmable gate arrays (FPGAs). For another example, when one of the units is implemented in a form of scheduling program code by a processing element, the processing element may be a general-purpose processor, for example, a central processing unit (CPU) or another processor that can invoke the program code. For still another example, the units may be integrated and implemented in a form of a system-on-a-chip (SoC).

Figure 14:
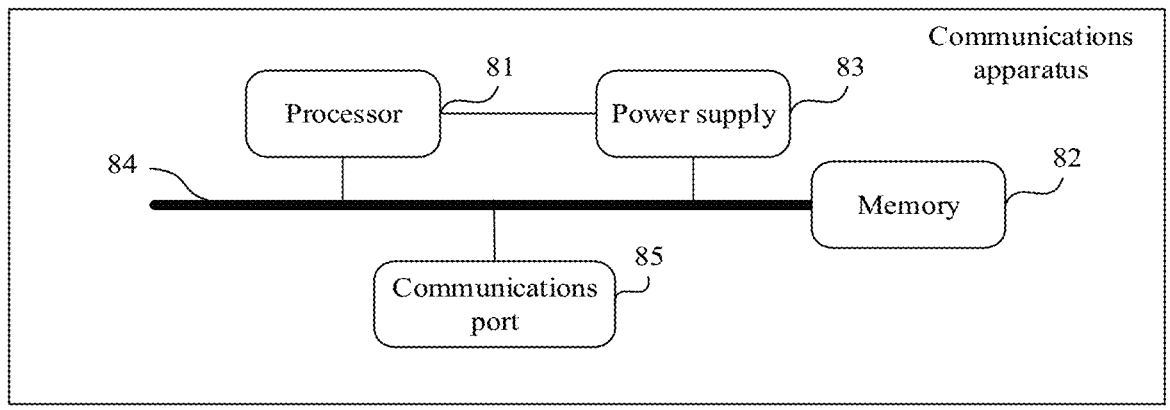
FIG. 14 is a schematic diagram of a structure of a communications apparatus according to an embodiment.

FIG. 14 is a schematic diagram of a structure of a communications apparatus according to an embodiment. As shown in FIG. 14, the communications apparatus may include a processor 81 (for example, a CPU) and a memory 82. The memory 82 may include a high-speed random-access memory (RAM), and may further include a non-volatile memory (NVM), for example, at least one disk memory. The memory 82 may store various instructions to complete various processing functions and implement the method steps. Optionally, the communications apparatus may further include a power supply 83, a communications bus 84, and a communications port 85. The communications bus 84 is configured to implement a communication connection between components. The communications port 85 is configured to implement connection and communication between the communications apparatus and other peripherals.

In this embodiment, the memory 82 is configured to store computer-executable program code. The program code includes instructions. When the processor 81 executes the instructions, the instructions enable the processor 81 of the communications apparatus to perform the actions of the NFVO in the foregoing method embodiments. An implementation principle and a technical effect thereof are similar, and details are not described herein again.

Alternatively, when the processor 81 executes the instructions, the instructions enable the processor 81 of the communications apparatus to perform the actions of the VNFM in the foregoing method embodiments. An implementation principle and a technical effect thereof are similar, and details are not described herein again.

Alternatively, when the processor 81 executes the instructions, the instructions enable the processor 81 of the communications apparatus to perform the actions of the VIM in the foregoing method embodiments. An implementation principle and a technical effect thereof are similar, and details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to embodiments are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive solid state disk (SSD)), or the like.

The term "a plurality of" in this specification means two or more. The term "and/or" in this specification describes only an association relationship between associated objects and represents that three relationships may exist. For example, A and/or B may represent the following three cases: only A exists, both A and B exist, and only B exists. In addition, the character "/" in this specification usually indicates an "or" relationship between the associated objects. In a formula, the character "/" indicates a "division" relationship between associated objects.

It may be understood that various numbers in embodiments are merely used for differentiation for ease of description, and are not used to limit the scope of embodiments.

It may be understood that sequence numbers of the foregoing processes do not mean execution sequences in embodiments. The execution sequences of the processes can be determined based on functions and internal logic of the processes, and may not be construed as any limitation on the implementation processes of embodiments.

What is claimed is:

1. A method comprising:
sending, by a network functions virtualization orchestrator (NFVO) to a virtualized network function (VNF) manager (VNFM), a VNF instantiation request message requesting to instantiate a VNF to start a VNF instance for an application for a network service (NS), wherein the application is not combined with another application into the NS and is not split into functional components or services;
obtaining, by the VNFM based on a quality of service (QoS) attribute of the VNF and a preset mapping relationship between the QoS attribute and a virtual resource location area, the virtual resource allocation area as a target virtual resource location area for deploying the VNF instance;
sending, by the VNFM to a virtualized infrastructure manager (VIM), a virtual resource allocation request message requesting to allocate a virtual resource for deploying the VNF instance, wherein the virtual resource allocation request message carries first information about the target virtual resource location area;
sending, by the VIM to the VNFM, a virtual resource allocation response message indicating second information about a target virtual resource for deploying the VNF instance, wherein the target virtual resource is located in the target virtual resource location area; and
instantiating, by the VNFM and based on the second information, the VNF on the target virtual resource.

2. The method of claim 1, wherein the VNF instantiation request message carries the QoS attribute.

3. The method of claim 1, wherein the VNF instantiation request message does not carry an affinity rule for deploying the VNF and does not carry an anti-affinity rule for deploying the VNF.

4. The method of claim 1, wherein the VNF is a virtualized multi-access edge application, wherein the QoS attribute is of the virtualized multi-access edge application, wherein the method further comprises further instantiating, by the VNFM, the VNF in a predetermined edge data center, and wherein the target virtual resource location area is located in the predetermined edge data center.

5. A communications system comprising:
a network functions virtualization orchestrator (NFVO) comprising:
a first transceiver; and
a first processor coupled to the first transceiver and configured to send, using the first transceiver, a virtualized network function (VNF) instantiation request message requesting to instantiate a VNF to start a VNF instance for an application for a network service (NS), wherein the application is not combined with another application into the NS and is not split into functional components or services;
a VNF manager (VNFM) coupled to the NFVO and comprising:
a second transceiver; and
a second processor coupled to the second transceiver and configured to:
receive, by the second transceiver, the VNF instantiation request message;
obtain, based on a quality of service (QoS) attribute of the VNF and a preset mapping relationship between the QoS attribute and a virtual resource location area, the virtual resource location area as a target virtual resource location area for deploying the VNF instance; and
send, using the second transceiver, a virtual resource allocation request message requesting to allocate a virtual resource for deploying the VNF instance, wherein the virtual resource allocation request message carries first information about the target virtual resource location area; and
a virtualized infrastructure manager (VIM) coupled to the VNFM and comprising:
a third transceiver; and
a third processor coupled to the third transceiver and configured to:
receive, using the third transceiver, the virtual resource allocation request message; and
send, using the third transceiver to the VNFM, a virtual resource allocation response message indicating second information about a target virtual resource for deploying the VNF instance, wherein the target virtual resource is located in the target virtual resource location area,
wherein the second transceiver is further configured to receive the virtual resource allocation response message, and
wherein the second processor is further configured to instantiate, based on the second information, the VNF on the target virtual resource.

6. The communications system of claim 5, wherein the VNF instantiation request message carries the QoS attribute.

7. The communications system of claim 5, wherein the VNF instantiation request message does not carry an affinity rule for deploying the VNF and does not carry an anti-affinity rule for deploying the VNF.

8. The communications system of claim 5, wherein the VNF is a virtualized multi-access edge application, wherein the QoS attribute is of the virtualized multi-access edge application, wherein the second processor is further configured to further instantiate the VNF in a predetermined edge data center, and wherein the target virtual resource location area is located in the predetermined edge data center.

9. The communications system of claim 5, wherein before determining the target virtual resource location area, the second processor is further configured to obtain the QoS attribute from a VNF descriptor (VNFD) file.

10. The communications system of claim 5, wherein the VNF instantiation request message does not carry an affinity rule for deploying the VNF.

11. The communications system of claim 5, wherein the VNF instantiation request message does not carry an anti-affinity rule for deploying the VNF.

12. The method of claim 1, wherein before determining the target virtual resource location area, the method further comprises obtaining the QoS attribute from a VNF descriptor (VNFD) file.

13. The method of claim 1, wherein the VNF instantiation request message does not carry an affinity rule for deploying the VNF.

14. The method of claim 1, wherein the VNF instantiation request message does not carry an anti-affinity rule for deploying the VNF.

15. A computer program product comprising computer-executable instructions that are stored on a non-transitory computer-readable medium and that, when executed by a processor, cause an apparatus to:

send, using a network functions virtualization orchestrator (NFVO) and to a virtualized network function (VNF) manager (VNFM), a VNF instantiation request message requesting to instantiate a VNF to start a VNF instance for an application for a network service (NS), wherein the application is not combined with another application into the NS and is not split into functional components or services;

obtain, using the VNFM based on a quality of service (QoS) attribute of the VNF and a preset mapping relationship between the QoS attribute and a virtual resource location area, the virtual resource location area as a target virtual resource location area for deploying the VNF instance;

send, using the VNFM and to a virtualized infrastructure manager (VIM), a virtual resource allocation request message requesting to allocate a virtual resource for deploying the VNF instance, wherein the virtual resource allocation request message carries first information about the target virtual resource location area;

send, using the VIM and to the VNFM, a virtual resource allocation response message indicating second information about a target virtual resource for deploying the VNF instance, wherein the target virtual resource is located in the target virtual resource location area; and instantiate, using the VNFM and based on the second information, the VNF on the target virtual resource.

16. The computer program product of claim 15, wherein the VNF instantiation request message carries the QoS attribute.

17. The computer program product of claim 15, wherein before determining the target virtual resource location area, the computer-executable instructions further cause the apparatus to obtain the QoS attribute from a VNF descriptor (VNFD) file.

18. The computer program product of claim 15, wherein the VNF instantiation request message does not carry an affinity rule for deploying the VNF and an anti-affinity rule for deploying the VNF.

19. The computer program product of claim 15, wherein the VNF instantiation request message does not carry an affinity rule for deploying the VNF or an anti-affinity rule for deploying the VNF.

20. The computer program product of claim 15, wherein the VNF is a virtualized multi-access edge application, wherein the QoS attribute is of the virtualized multi-access edge application, wherein the method further comprises further instantiating, by the VNFM, the VNF in a predetermined edge data center, and wherein the target virtual resource location area is located in the predetermined edge data center.

* * * * *